(12) United States Patent
Fujikata et al.

(10) Patent No.: US 9,703,125 B2
(45) Date of Patent: Jul. 11, 2017

(54) SILICON-BASED ELECTRO-OPTIC MODULATOR

(71) Applicant: NEC Corporation, Minato-ku, Tokyo (JP)

(72) Inventors: Junichi Fujikata, Tokyo (JP); Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/777,791

(22) PCT Filed: Nov. 28, 2013

(86) PCT No.: PCT/JP2013/006990
§ 371 (c)(1),
(2) Date: Sep. 17, 2015

(87) PCT Pub. No.: WO2014/155450
PCT Pub. Date: Oct. 2, 2014

(65) Prior Publication Data
US 2016/0291350 A1    Oct. 6, 2016

(30) Foreign Application Priority Data

Mar. 26, 2013  (JP) .................................. 2013-063285

(51) Int. Cl.
*G02F 1/035* (2006.01)
*G02F 1/025* (2006.01)
(Continued)

(52) U.S. Cl.
CPC ............ *G02F 1/025* (2013.01); *G02F 1/2255* (2013.01); *G02F 1/2257* (2013.01);
(Continued)

(58) Field of Classification Search
None
See application file for complete search history.

(56) References Cited

U.S. PATENT DOCUMENTS

| 8,532,440 B2* | 9/2013 | Ushida ................... G02F 1/025 385/131 |
| 8,693,811 B2* | 4/2014 | Morini .................. 257/E21.499 |
| 2012/0057815 A1* | 3/2012 | Ezaki ...................... G02F 1/025 385/3 |

FOREIGN PATENT DOCUMENTS

| JP | 2004-503799 A | 2/2004 |
| JP | 2006-515082 A | 5/2006 |

(Continued)

OTHER PUBLICATIONS

M. Takenaka, et al., Strain Engineering of Plasma Dispersion Effect for SiGe Optical Modulators, IEEE Journal of Quantum Electronics, Jan. 2012, vol. 48, No. 1, pp. 8-16.

(Continued)

*Primary Examiner* — Tina Wong

(57) ABSTRACT

Provided is a silicon-based electro-optic modulator which is small in size and capable of high speed operation. A first silicon semiconductor layer (120) doped to exhibit a first type of conductivity and a second semiconductor layer (160) doped to exhibit a second type of conductivity are at least partly stacked together, and a relatively thin dielectric (150) is formed at the interface between the stacked first and second silicon semiconductor layers (120, 160). The first silicon semiconductor layer (120) has a rib waveguide shape (130) comprising a rib portion (131) and slab portions (132). A first heavily doped region (140) formed by a high concentration doping process is arranged at a location, in the first silicon semiconductor layer (120), neighboring to each of the slab portions (132). The first heavily doped region (140) has almost the same height as that of the rib portion (131) of the rib waveguide (130).

17 Claims, 21 Drawing Sheets

(51) Int. Cl.
*G02F 1/225* (2006.01)
*G02F 1/01* (2006.01)
*G02F 1/015* (2006.01)
*G02F 1/21* (2006.01)

(52) U.S. Cl.
CPC .................. *G02F 2001/0113* (2013.01); *G02F 2001/0152* (2013.01); *G02F 2001/212* (2013.01); *G02F 2201/063* (2013.01)

(56) References Cited

FOREIGN PATENT DOCUMENTS

| | | |
|---|---|---|
| JP | 2011-180595 A | 9/2011 |
| JP | 2012-013935 A | 1/2012 |
| JP | 2012-053399 A | 3/2012 |
| JP | 2012-128065 A | 7/2012 |
| JP | 2012-521576 A | 9/2012 |
| WO | 2011/030593 A1 | 3/2011 |

OTHER PUBLICATIONS

William M. J. Green, Michael J. Rooks, Lidija Sekaric, and Yurii A. Vlasof, Opt. Express 15, 17106-171113 (2007), "Ultra-compact, low RF power and 10 Gb/s silicon Mach-Zehnder modulator".
English translation of Written opinion for PCT Application No. PCT/JP2013/006990.
International Search Report for PCT Application No. PCT/JP2013/006990, mailed on Feb. 25, 2014.

* cited by examiner

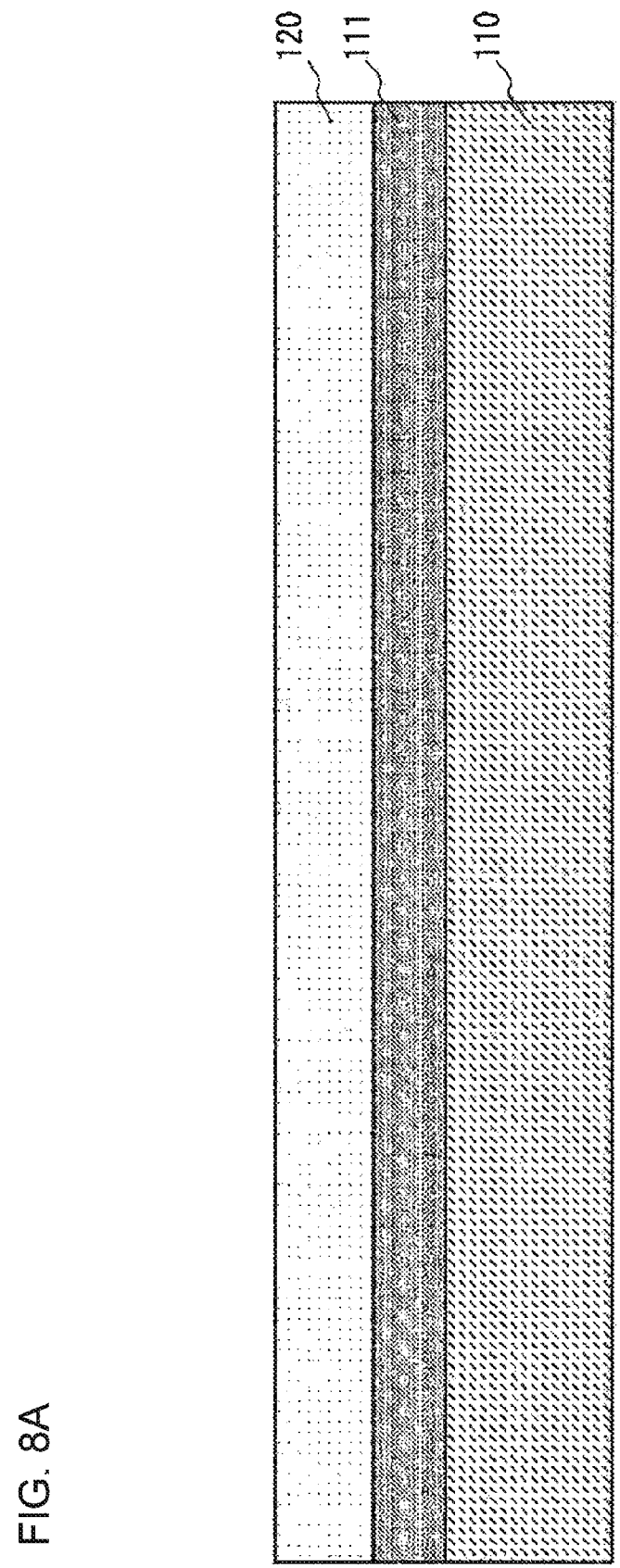

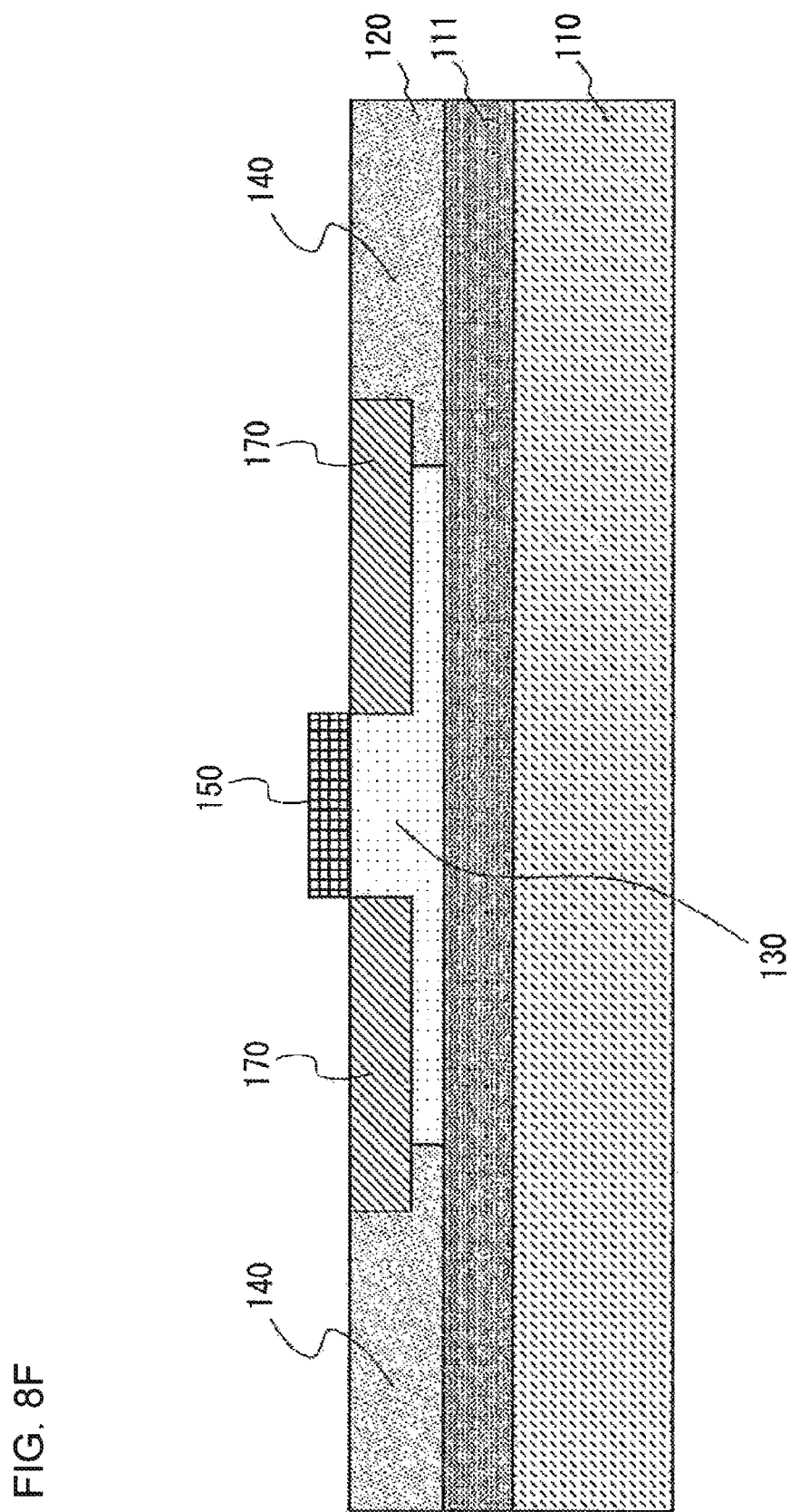

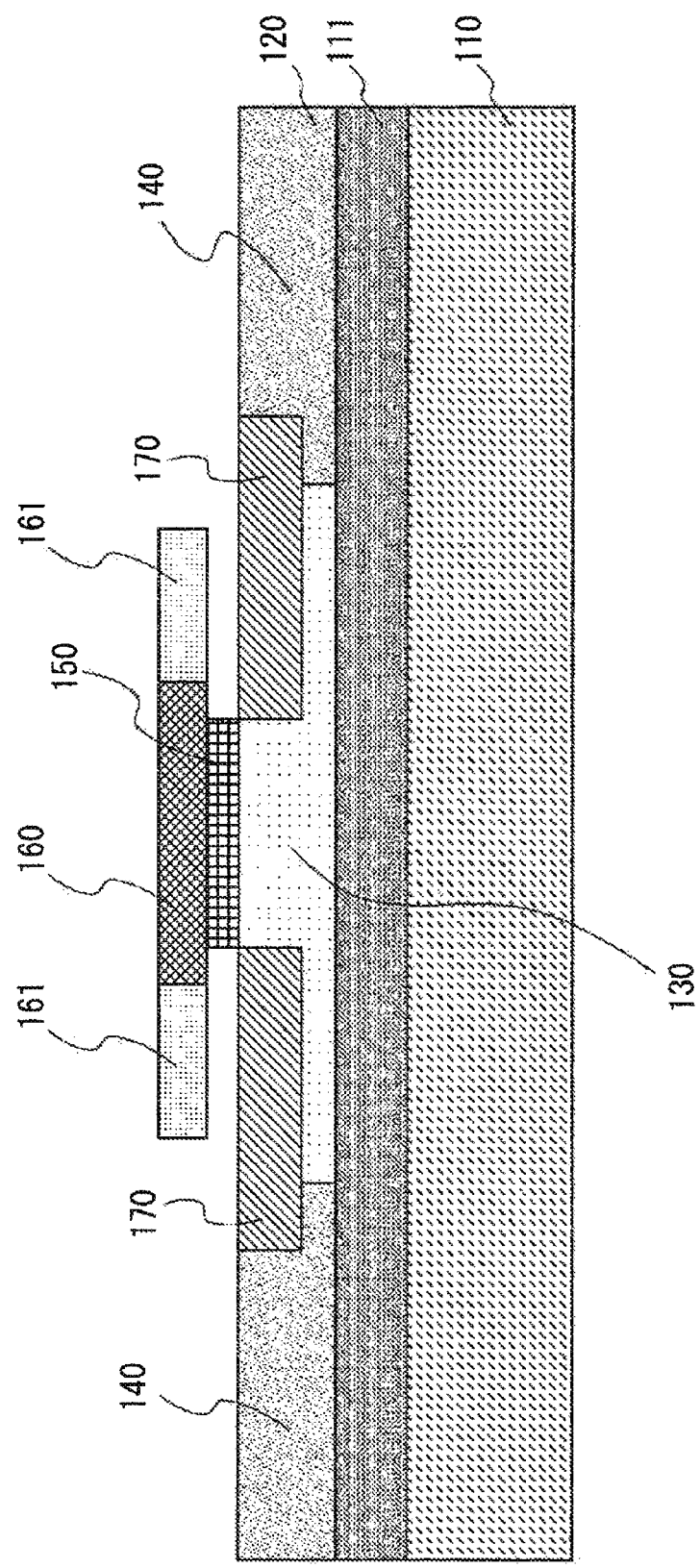

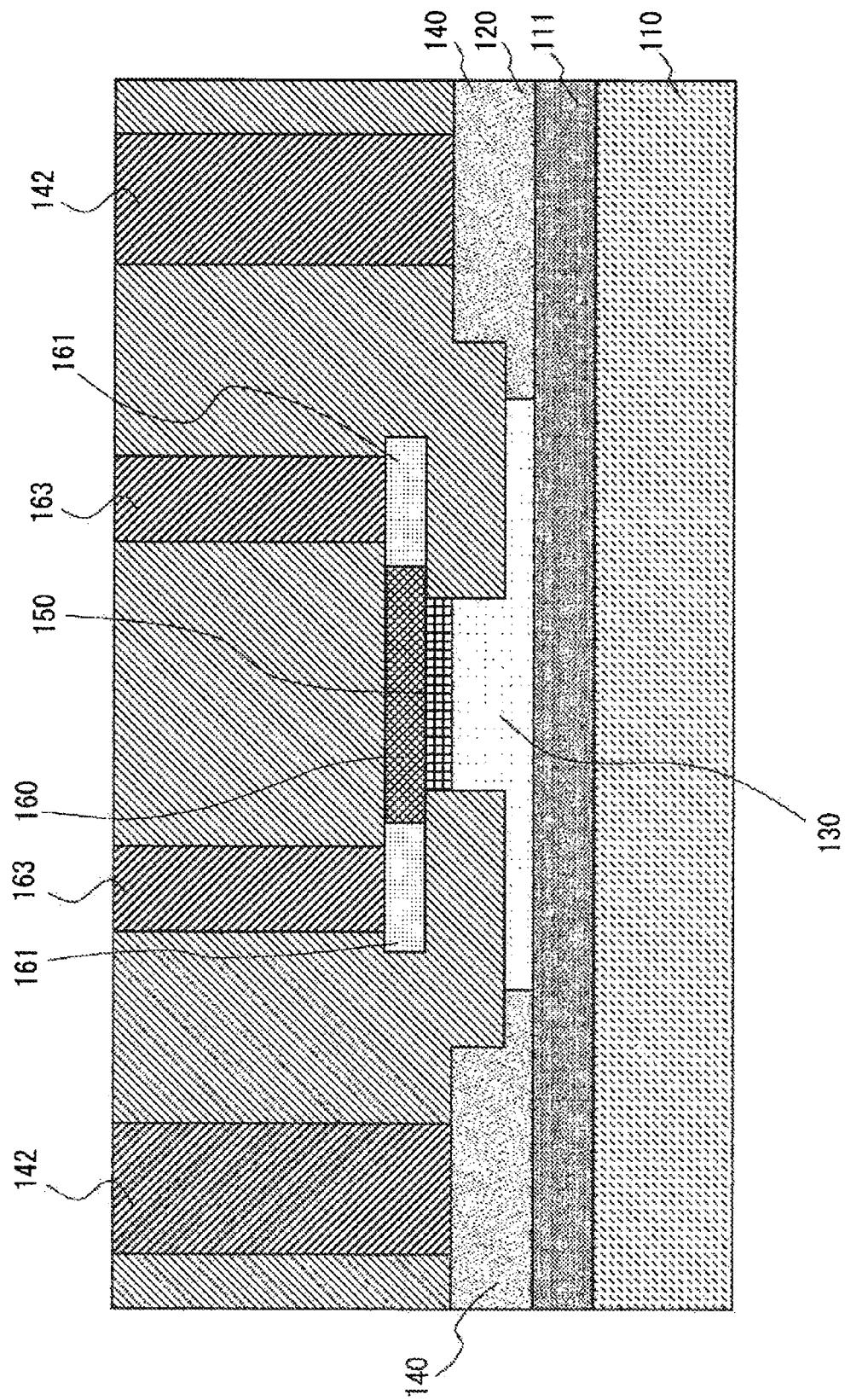

SILICON-BASED ELECTRO-OPTIC MODULATOR

This application is a National Stage Entry of PCT/JP2013/006990 filed on Nov. 28, 2013, which claims priority from Japanese Patent Application 2013-063285 filed on Mar. 26, 2013, the contents of all of which are incorporated herein by reference, in their entirety.

TECHNICAL FIELD

The present invention relates to a silicon-based electro-optic modulator for high speed conversion of high speed electrical signals into optical signals, and more specifically, it relates to, for example, a silicon electro-optic modulator which is formed on a silicon-on-insulator (SOI) substrate and uses a capacitor structure having a silicon-insulator-silicon configuration. The present invention is to be used, for example, in the information processing and telecommunications fields.

BACKGROUND ART

In the information processing and telecommunications fields, in order to increase the information transmission amount per channel or the transmission rate, it is important to achieve an optical modulator for performing high speed modulation into optical signals of signals from an LSI circuit in charge of information processing in an optical communication device. Silicon-based optical communication devices functioning at 1310 and 1550 nm fiber-optic communication wavelengths for a variety of systems such as of fiber-to-the-home and local area networks (LANs) are highly promising technologies which enable integration of optical functioning elements and electronic circuits together on a silicon platform by means of CMOS technologies. In recent years, silicon-based passive optical devices such as waveguides, couplers and wavelength filters have been studied very extensively. Important technologies as means for manipulating optical signals for such communication systems include silicon-based active devices such as optical modulators and switches, which also have been attracting much attention. In this respect, optical switches and modulators using a thermo-optic effect of silicon to change the refractive index operate at low speed, and accordingly, their use is limited to that in cases of device speeds corresponding to modulation frequencies not higher than 1 Mb/second. Accordingly, in order to realize a high modulation frequency demanded in a larger number of optical communication systems, optical modulators using an electro-optic effect are required.

Most of the electro-optic modulators proposed to date are devices which use a carrier plasma effect to change the free carrier density in a silicon layer and thereby change the real and imaginary parts of the refractive index, thus changing the phase and intensity of light. Such wide use of the above-mentioned effect is because of the fact that pure silicon does not exhibit a linear electro-optic effect (the Pockels effect) and that a change in its refractive index due to the Franz-Keldysh effect or the Kerr effect is very small. In modulators using free carrier absorption, the output is directly modulated through a change in absorption of light propagating in Si. As a structure using such refractive index change, one employing a Mach-Zehnder interferometer is generally used, where intensity modulated optical signals can be obtained by causing optical phase differences in the two arms to interfere with each other.

Free carrier density in the electro-optical modulators can be varied by injection, accumulation, depletion or inversion of free carriers. Most of such devices having been studied to date have low optical modulation efficiency, and accordingly, for optical phase modulation, require a length on the order of millimeters and an injection current density higher than 1 kA/cm$^3$. In order to realize size reduction, higher integration and also reduction in power consumption, a device structure giving high optical modulation efficiency is required, and if it is achieved, reduction in the optical phase modulation length becomes possible. In case of a large device size, the device becomes susceptible to the influence of temperature distribution over the silicon platform, and it is accordingly anticipated that a change in the refractive index of the silicon layer caused by a thermo-optic effect due to the temperature distribution cancels out the essentially existing electro-optic effect, thus raising a problem.

FIG. 1 shows a typical example of a silicon-based electro-optic phase modulator using a rib waveguide structure formed on an SOI substrate, which is shown in Non-patent Document 1. The structure shown in FIG. 1 corresponds to a PIN diode type modulator, and has a structure where the free carrier density in an intrinsic semiconductor region is changed by applying forward and reverse biases, and the refractive index is accordingly changed using a carrier plasma effect. In the electro-optic phase modulator, the rib waveguide structure is formed using the Si layer on the silicon-on-insulator (SOI) substrate. FIG. 1 is a cross-sectional view of the optical modulator in a plane perpendicular to the propagation direction of light. The optical modulator comprises an oxide layer 12 on the top surface of a silicon substrate 11 as a support substrate. On the top surface of the oxide layer 12, a rib waveguide 14 is formed. The rib waveguide 14 comprises in its central part a protruding portion 15 to become the core, and also comprises slab portions 16 which are present on respective sides of the protruding portion 15 and connected with it. (In the present Description, the protruding portion may be referred to also as a rib portion.) The rib waveguide 14 is an intrinsic semiconductor silicon layer.

Further, on the sides of the respective slab portions 16, a p-type region 17 and an n-type region 18 are respectively formed by p-type or n-type doping processes into the intrinsic semiconductor silicon layer. (A PIN diode structure is thus constructed.) On the top surface of the p-type region 17, a first electrode contact layer 19 is formed, and the first electrode contact layer 19 is then connected with an electrode wiring 21. On the top surface of the n-type region 18, a second electrode contact layer 20 is formed, and the second electrode contact layer 20 is then connected with another electrode wiring 21. In the PIN diode structure, the p-type region 17 and the n-type region 18 may be doped to exhibit a carrier density of about $10^{20}$ per unit volume (1 cm$^3$). Then, in a manner to entirely cover the rib waveguide 14, the p-type region 17 and the n-type region 18, an oxide cladding layer 13 to function also as a cladding layer in the waveguide is arranged.

In terms of optical modulation, the optical modulator is connected to a power supply through the first and second electrode contact layers 19 and 20 so as to apply a forward bias to the PIN diode and thereby inject free carriers into the waveguide. When the forward bias is applied, the refractive index of the intrinsic semiconductor silicon layer (that is, the rib waveguide 14) is changed as a result of the increase in free carriers, and phase modulation of light transmitted through the waveguide 14 is thereby performed. Such prior art PIN diode phase modulators generally have an operation speed in the range of 10-50 Mb/second during the forward bias operation. Here, the speed of optical modulation operation is limited by the lifetime of free carriers in the rib waveguide 14 and carrier diffusion in there when the forward bias is removed. In this respect, it is possible to increase the switching speed by introducing impurities into the silicon layer and thereby reducing the carrier lifetime, but it raises a problem in that the introduced impurities deteriorate the optical modulation efficiency.

Further, the most influencing factor on the operation speed is one due to the RC time constant, where the capacitance (C) at a time of forward bias application becomes very large as a result of reduction in the carrier depletion layer width of the PN junction. While, theoretically, high speed operation of the PN junction could be achieved by applying a reverse bias, it requires a relatively high drive voltage or a large device size.

Patent Literature 1 (Japanese translation of PCT international application No. 2006-515082) discloses an example of a silicon-based electro-optical modulator 30, as shown in FIG. 2, in which an SIS (silicon-insulator-silicon) junction is formed.

In the waveguide structure of the optical modulator 30, a p-doped silicon layer 34 and an n-doped silicon layer 38 are stacked across a relatively thin dielectric layer 42. As shown in FIG. 2, the optical modulator 30 comprises a silicon substrate (support substrate) 31, an oxide layer 32, an oxide cladding layer 33 and electrode wirings 41. On the top surface of the oxide layer 32, the relatively thin silicon surface layer 34 doped to have a first type of conductivity is formed. It is assumed that the relatively thin silicon surface layer doped to have a first type of conductivity (for example, doped with p-type dopants) is referred to as a body region 34. Above the top surface of the body region 34, a gate region 38 is formed in a manner to at least partly overlap with the body region 34. The gate region 38 is formed of a relatively thin silicon region doped to have a second type of conductivity (for example, doped with n-type dopants). Between the body region 34 and the gate region 38, a thin gate dielectric 42 is interposed.

In an end portion of the body region 34 (the right end portion in FIG. 2), a heavily doped region 35 is formed by a high concentration doping process, then a first electrode contact layer 36 is formed on the top surface of the heavily doped region 35, and the first electrode contact layer 36 is connected to an electrode wiring 37. In an end portion of the gate region 38 (the left end portion in FIG. 2), a heavily doped region 39 is formed by a high concentration doping process, then a second electrode contact layer 40 is formed on the top surface of the heavily doped region 39, and the second electrode contact layer 40 is connected to an electrode wiring 41.

In the configuration described above, doping processes are applied to the gate region 38 and the body region 34, where the resultant doped portions are defined such that the carrier density change is controlled there by an external signal voltage. Then, it is ideally desirable to make an optical signal electric field coincide with the region where the carrier density is externally and dynamically controlled, in which situation optical phase modulation can be performed by accumulating, depleting or inverting free carriers on each side of the gate dielectric layer 42. However, there practically is a problem in that the region where the carrier density dynamically changes is as thin as about a few tens of nanometers, which results in a problem in that an optical modulation length on the order of millimeters is required, the electro-optical modulator accordingly becomes large in size, and high speed operation consequently becomes difficult.

CITATION LIST

Patent Literature

[PTL 1]: Japanese translation of PCT international application No. 2006-515082

Non Patent Literature

[NPL 1]: William M. J. Green, Michael J. Rooks, Lidija Sekaric, and Yurii A. Vlasof, Opt. Express 15, 17106-171113 (2007), "Ultra-compact, low RF power and 10 Gb/s silicon Mach-Zehnder modulator."

SUMMARY OF INVENTION

Technical Problem

Therefore, in a silicon-based electro-optic modulator capable of being integrated on a Si substrate, it has been difficult, by the use of the prior art technologies, to realize an optical modulator structure based on a carrier plasma effect which can realize, in a sub-micron region, a low cost, a low current density, low power consumption, a high modulation rate, low voltage drive and high speed modulation.

Further, if the Si layer thickness were reduced for the purpose of increasing the optical modulation efficiency, the resistance of an extraction electrode becomes large, and accordingly, high speed operation becomes difficult.

In this respect, the objective of the present invention is to provide a silicon-based electro-optic modulator with a small size and capable of high speed operation, in which improvement in overlap between an optical field and a region where the free carrier density changes, enhancement of a carrier plasma effect and reduction in the resistance of an extraction electrode are achieved.

Solution to Problem

A silicon-based electro-optic modulator of the present invention is one which: has an SIS (semiconductor-insulator-semiconductor) junction in which a first silicon semiconductor layer doped to exhibit a first type of conductivity and a second semiconductor layer doped to exhibit a second type of conductivity are at least partly stacked together, and a relatively thin dielectric is formed at the interface between the stacked first and second silicon semiconductor layers; and exploits that the free carrier concentration felt by an optical signal electric field is modulated as a result of free carriers' being accumulated, depleted or inverted on each side of the relatively thin dielectric layer by electrical signals from electrical terminals connected with, respectively, the stacked first and second silicon semiconductor layers, wherein the silicon-based electro-optic modulator is characterized by that: the first silicon semiconductor layer is fabricated into a rib waveguide shape comprising a rib portion formed into a protruding shape, which is a portion to be the core of the rib waveguide, and slab portions which are located on respective sides of the rib portion and connected with the rib portion;

the silicon-based electro-optic modulator comprises a first heavily doped region formed by a high concentration doping process, in a portion of the first silicon semiconductor layer neighboring to each of the slab portions, and a second heavily doped region formed by high concentration doping into a portion of the second silicon semiconductor layer; and the first heavily doped region has almost the same height as that of the rib portion of the rib waveguide.

Advantageous Effects of Invention

According to the configuration of the present invention, it is possible to achieve a silicon-based electro-optic modulator with a small size and capable of high speed operation, in which overlap between an optical field and a region where the free carrier density changes is improved, a carrier plasma effect is enhanced, and the resistance of an extraction electrode is reduced.

DESCRIPTION OF EMBODIMENTS

Figure 1:
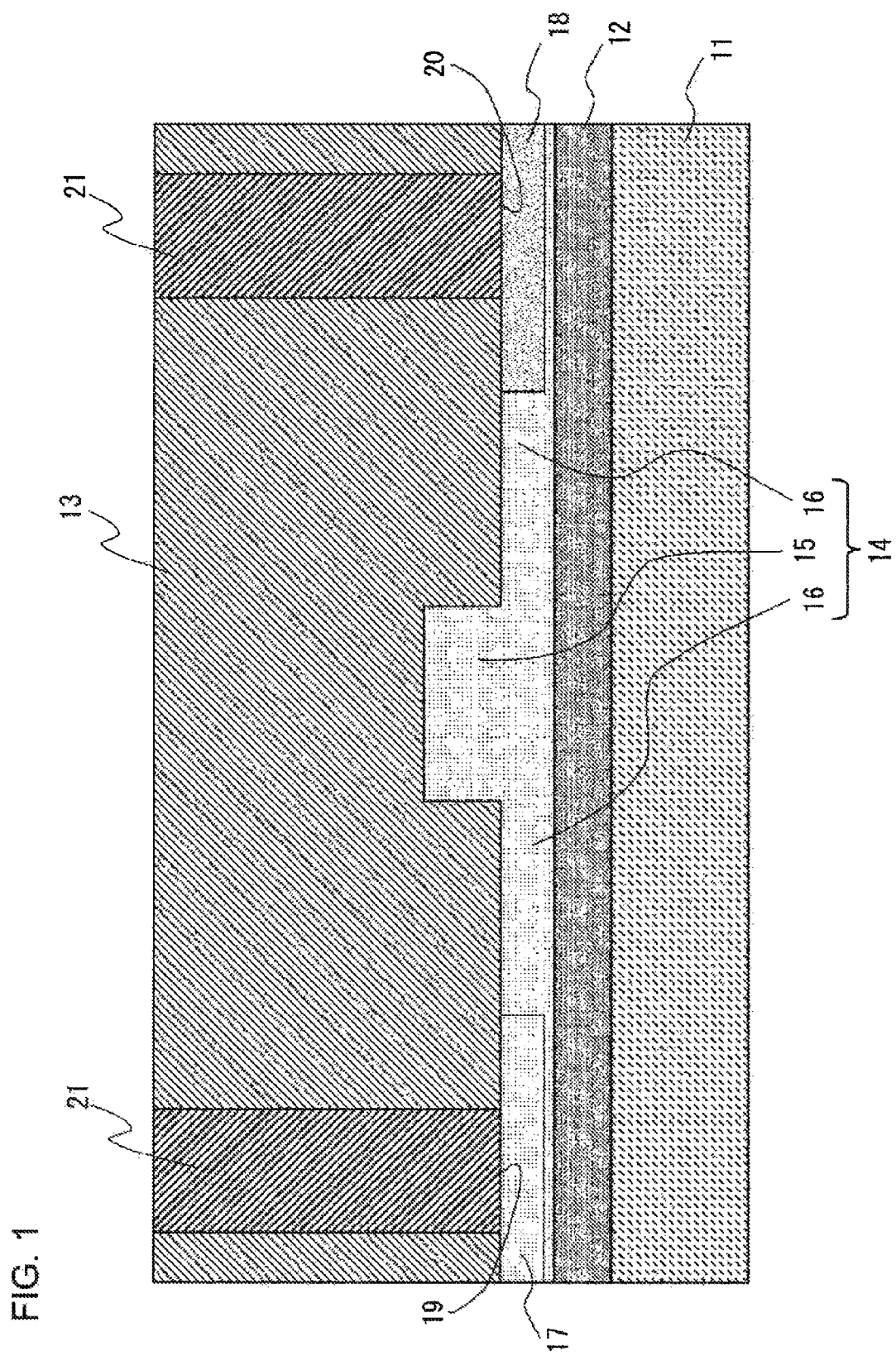
FIG. 1 A cross-sectional view of an example of a structure of an electro-optical modulator consisting of a PIN structure, as a background art technology FIG. 2 A cross-sectional view of an example of a structure of an electro-optical modulator consisting of an SIS structure, as another background art technology FIG. 3 A cross-sectional view of a silicon-based electro-optic modulator according to a first exemplary embodiment FIG. 4 A diagram showing an example of adjusting the thickness of a second silicon semiconductor layer FIG. 5 A diagram showing an example of adjusting the thickness of a second silicon semiconductor layer FIG. 6 A diagram showing a state where a $Si_{1-x}Ge_x$ (x=0.01 to 0.9) layer is formed in a top region of a rib portion of a rib waveguide FIG. 7 A diagram showing a state where two kinds of $Si_{1-x}Ge_x$ (x=0.01 to 0.9) layers are formed in a top region of a rib portion of a rib waveguide FIG. 8A A diagram for explaining a manufacturing process of an electro-optic modulator FIG. 8B A diagram for explaining the manufacturing process of the electro-optic modulator FIG. 8C A diagram for explaining the manufacturing process of the electro-optic modulator FIG. 8D A diagram for explaining the manufacturing process of the electro-optic modulator FIG. 8E A diagram for explaining the manufacturing process of the electro-optic modulator FIG. 8F A diagram for explaining the manufacturing process of the electro-optic modulator FIG. 8G A diagram for explaining the manufacturing process of the electro-optic modulator FIG. 8H A diagram for explaining the manufacturing process of the electro-optic modulator FIG. 8I A diagram for explaining the manufacturing process of the electro-optic modulator FIG. 8J A diagram for explaining the manufacturing process of the electro-optic modulator FIG. 9 A diagram showing a frequency characteristic of the optical modulation efficiency of an electro-optic modulator according to the present invention FIG. 10 A Mach-Zehnder interferometer type optical intensity modulator using a silicon-based electro-optic modulator FIG. 11 A diagram showing an example where Mach-Zehnder interferometer type optical intensity modulators each using silicon-based electro-optic modulators are arranged in parallel FIG. 12 A diagram showing an example where Mach-Zehnder interferometer type optical intensity modulators each using silicon-based electro-optic modulators are arranged in series

Before describing exemplary embodiments of a silicon-based electro-optic modulator of the present invention, outline of a modulation mechanism in silicon will be described, as an operating principle of the present invention. Some ones of exemplary embodiments to be described later are associated with a modulation structure, and any silicon-based electro-optic modulators of the present invention are ones using an electro-optic effect (free carrier plasma effect) described below.

In silicon, because a pure electro-optic effect is not present or is very weak, only a free carrier plasma effect or a thermo-optic effect can be used for optical modulation operation. For high speed operation (Gb/second or beyond) aimed at in the present invention, only the free carrier plasma effect is effective, and the effect is described by the following relations in first order approximation.

[Expression 1]

$$\Delta n = -\frac{e^2\lambda^2}{8\pi^2c^3\varepsilon_0 n}\left(\frac{\Delta N_e}{m_e}+\frac{\Delta N_h}{m_h}\right) \quad \text{(Expression 1)}$$

[Expression 2]

$$\Delta k = -\frac{e^3\lambda^2}{8\pi^3c^3\varepsilon_0 n}\left(\frac{\Delta N_e}{m_e^2\mu_e}+\frac{\Delta N_h}{m_h^2\mu_h}\right) \quad \text{(Expression 2)}$$

In the above expressions, $\Delta n$ and $\Delta k$ represent, respectively, the real and imaginary parts of a change in refractive index of a silicon layer.

There, e is the electron charge, $\lambda$ the optical wavelength, $\varepsilon_0$ the permittivity of free space, n the refractive index of intrinsic semiconductor silicon, $m_e$ the effective mass of electron carriers, $m_h$ the effective mass of hole carriers, $\mu_e$ the mobility of electron carriers, $\mu_h$ the mobility of hole carriers, $\Delta N_e$ a change in electron carrier concentration, and $\Delta N_h$ a change in hole carrier concentration.

In a $Si_{1-x}Ge_x$ (x=0.01 to 0.9) layer, by increasing the Ge content, the effective mass is reduced for both electron carriers and hole carriers, and accordingly, a larger amount of change in refractive index can be obtained. At that time, the imaginary part of refractive index, that is, the optical absorption coefficient also is increased. Therefore, in an electro-optic modulator, it is important to figure out a composition of the $Si_{1-x}Ge_x$ (x=0.01 to 0.9) layer and its stack configuration so as to improve overlap between an optical field and a region where the free carrier density changes, thus reducing the active layer length.

Because a $Si_{1-x}Ge_x$ (x=0.01 to 0.9) layer has a larger refractive index than that of a silicon semiconductor layer, it gives an effect to improve overlap between an optical field and a region where the free carrier density changes, and accordingly enable remarkable reduction in the active layer length.

By increasing the Ge content of a $Si_{1-x}Ge_x$ layer, the carrier plasma effect is further enhanced. In that case, in order to avoid optical absorption due to electron energy transition in the $Si_{1-x}Ge_x$ layer at 1310 nm and 1550 nm wavelengths to be used in optical communication systems, x=0.01 to 0.9 is desirable for the Ge content. By applying a strain to the $Si_{1-x}Ge_x$ (x=0.01 to 0.9) layer, the effective mass of electron carriers and that of hole ones are further reduced, and accordingly, a further larger carrier plasma effect can be obtained.

Experimental evaluations of the electro-optic effect in silicon have been performed, where it has been realized that changes in the refractive index as a function of the carrier density at the 1310 and 1550 nm wavelengths used in optical communication systems agree well with the Drude expression. In an electro-optic modulator using the effect, the amount of phase change is defined by the following expression.

[Expression 3]

$$\Delta\theta = \frac{2\pi}{\lambda}\Delta n_{eff} L \quad \text{(Expression 3)}$$

In the above expression, L is the length of the active layer in the direction of light propagation in the electro-optic modulator.

In the present invention, the above-described phase change amount is a larger effect compared to optical absorption, which enables an electro-optic modulator described below to exhibit a feature essentially as a phase modulator.

(First Exemplary Embodiment)

Hereinafter, exemplary embodiments of the present invention will be described with reference to drawings.

Disclosed below is an electro-optic phase modulator consisting of a (silicon semiconductor)-(dielectric layer)-(silicon semiconductor) junction on an SOI substrate and using the free carrier plasma effect.

Figure 3:
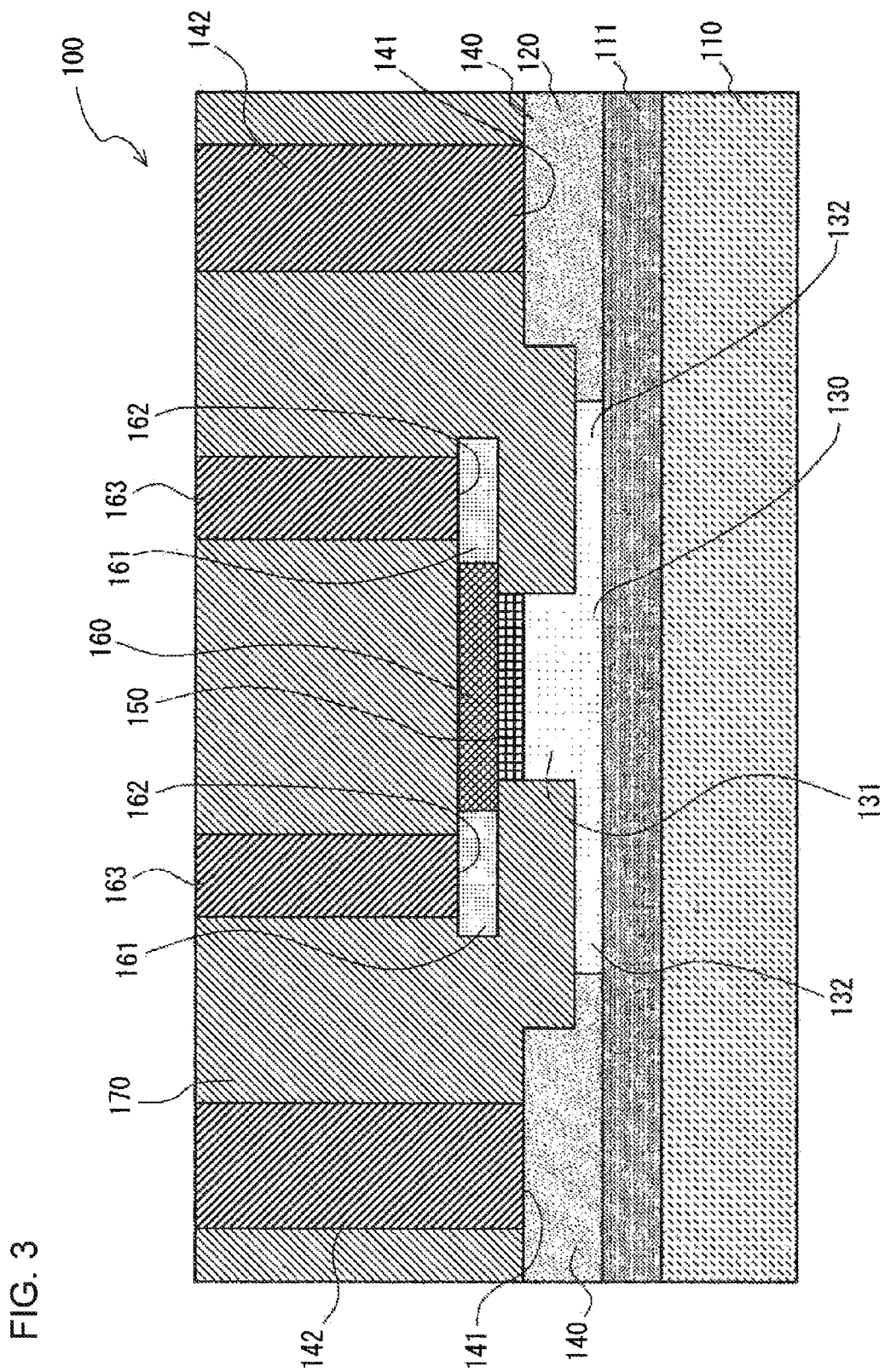

FIG. 3 is a cross-sectional view of a silicon-based electro-optic modulator 100 according to a first exemplary embodiment, which is a cross-sectional view in a plane perpendicular to the direction of light propagation.

The electro-optic modulator 100 comprises an oxide layer 111 on the top surface of a silicon substrate 110 as a support substrate. On the top surface of the oxide layer 111, a first silicon semiconductor layer 120 doped to have a first type of conductivity (for example, p-type conductivity) is formed. The first silicon semiconductor layer 120 has its central part formed to be a rib waveguide 130, and heavily doped regions 140 are formed on respective sides of the rib waveguide 130.

The rib waveguide 130 comprises in its central part a protruding portion 15 to become the core, and also comprises slab portions 132 which are present on respective sides of the protruding portion 131 and connected with it.

(In the present Description, the protruding portion may be referred to also as a rib portion.) In respective regions outside the slab portions 132, the heavily doped regions 140, 140 are formed. Further, on the top surface of each of the heavily doped regions 140, 140, a first electrical contact portion 141, 141 is formed.

For example, the first electrical contact portions 141, 141 are silicide layers. In the present case, the first electrical contact portions 141, 141 are located at a higher position than the slab portions 132, 132.

(That is, the thickness of the heavily doped regions 140, 140 is larger than that of the slab portions 132, 132, and as a result, the top surfaces of the heavily doped regions 140, 140 are located at a higher position than the slab portions 132, 132.) In FIG. 3, specifically, the first electrical contact portions 141, 141 are formed at almost the same height as the protruding portion (the rib portion 131) of the rib waveguide 130.

(That is, the top surfaces of the heavily doped regions 140, 140 are located at almost the same height as that of the protruding portion (the rib portion 131) of the rib waveguide 130.)

In other words, in the cross-sectional view of FIG. 3, the first silicon semiconductor layer 120 is depressed in the regions of the slab portions 132, 132, and raised in the regions of the rib portion 131 and of the first contact portions 141, 141. To each of the first electrical contact portions 141, 141, an electrode wiring 142, 142 is connected.

Further, a dielectric layer 150 is formed on the top surface of the rib portion 131 of the rib waveguide 130. The dielectric layer 150 is formed to be relatively thin. (Here, although the dielectric layer 150 is relatively thin, it is illustrated to be thicker to some extent, for the sake of clarity of the drawing.)

On the top surface of the dielectric layer 150, a second silicon semiconductor layer 160 doped to have a second type of conductivity (for example, n-type conductivity) is formed. The second silicon semiconductor layer 160 is formed in a manner to have a sufficiently lager width than that of the rib portion 131 of the rib waveguide 130, and to overhang such that it overlaps, in the top view, even with the slab regions 132, 132 of the rib waveguide 130. In each of end portions of the second silicon semiconductor layer 160, a heavily doped region 161, 161 is formed by high concentration doping. On the top surface of each of the heavily doped regions 161, 161, a second electrical contact portion 162, 162 is formed. For example, the second electrical contact portions 162, 162 are silicide layers. To each of the second electrical contact portions 162, 162, an electrode wiring 163 is connected.

Thus stacking the first silicon semiconductor layer 120 (rib waveguide 130), the dielectric layer 150 and the second silicon semiconductor layer 160 results in an SIS (semiconductor-insulator-semiconductor) junction. Then, an oxide cladding layer 170 is arranged in a manner to entirely cover the first silicon semiconductor layer 120 and the second silicon semiconductor layer 160.

When electrical signals are supplied from the electrode wirings 142, 142 to the rib waveguide 130 and from the electrode wirings 163, 163 to the second silicon semiconductor layer 160, the free carriers are accumulated, depleted or inverted on each side of the dielectric layer 150, and thereby, the free carrier concentration felt by an optical signal electric field is modulated. In that way, generation of modulated optical signals is performed.

According to the first exemplary embodiment described above, it becomes possible to reduce the electrode extraction resistance, that is, the series resistance component, and thereby reduce the RC time constant, because the heavily doped regions 140, 140 and the first electrical contact portions 141, 141 are formed at almost the same height as the rib portion 131 of the rib waveguide 130. Specifically, in forming silicide layers (the first electrical contact portions 141) when connecting the electrode wirings 142, 142 to respective ones of the heavily doped regions 140, 140, it is easy to form the silicide layers to be stable because the heavily doped regions 140, 140 have a sufficient thickness, and as a result, the connection resistance of each combination of the electrode wiring 142, 142 and the heavily doped region 140, 140 can be stably reduced.

Figure 2:
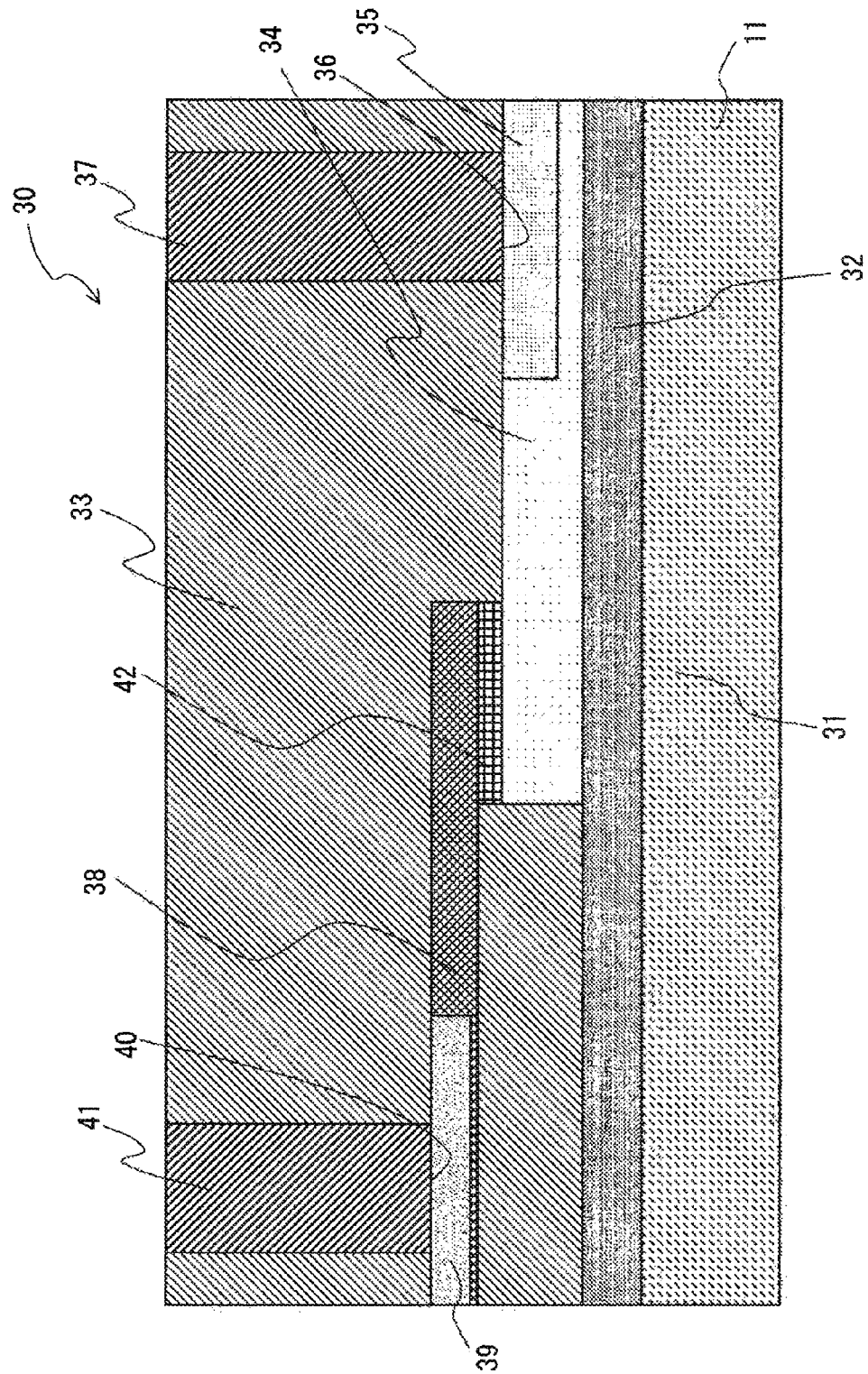

The structures of the prior art technologies, described in FIGS. 1 and 2, each have a drawback in that overlap between an optical field and an area where the carrier density is modulated is small and the electro-optic modulator accordingly becomes large in size. In this regard, in the present exemplary embodiment, as a result of confining an optical field by employing the rib waveguide structure and further adjusting the thickness of the second silicon semiconductor layer 160, it becomes possible to improve the overlap between an optical field and an area where the carrier density is modulated and accordingly to reduce the size of the electro-optic modulator.

Figure 4:
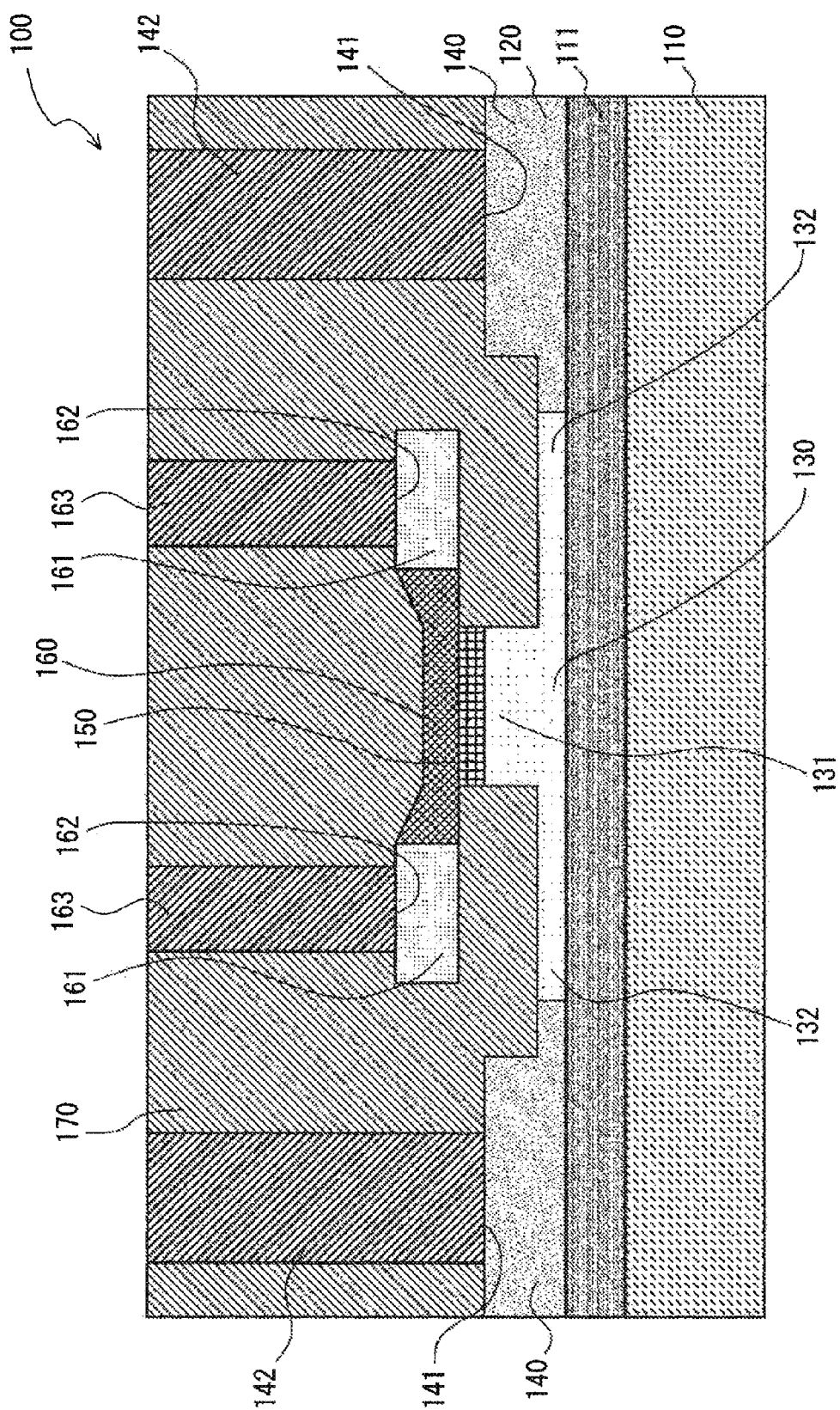
Figure 5:
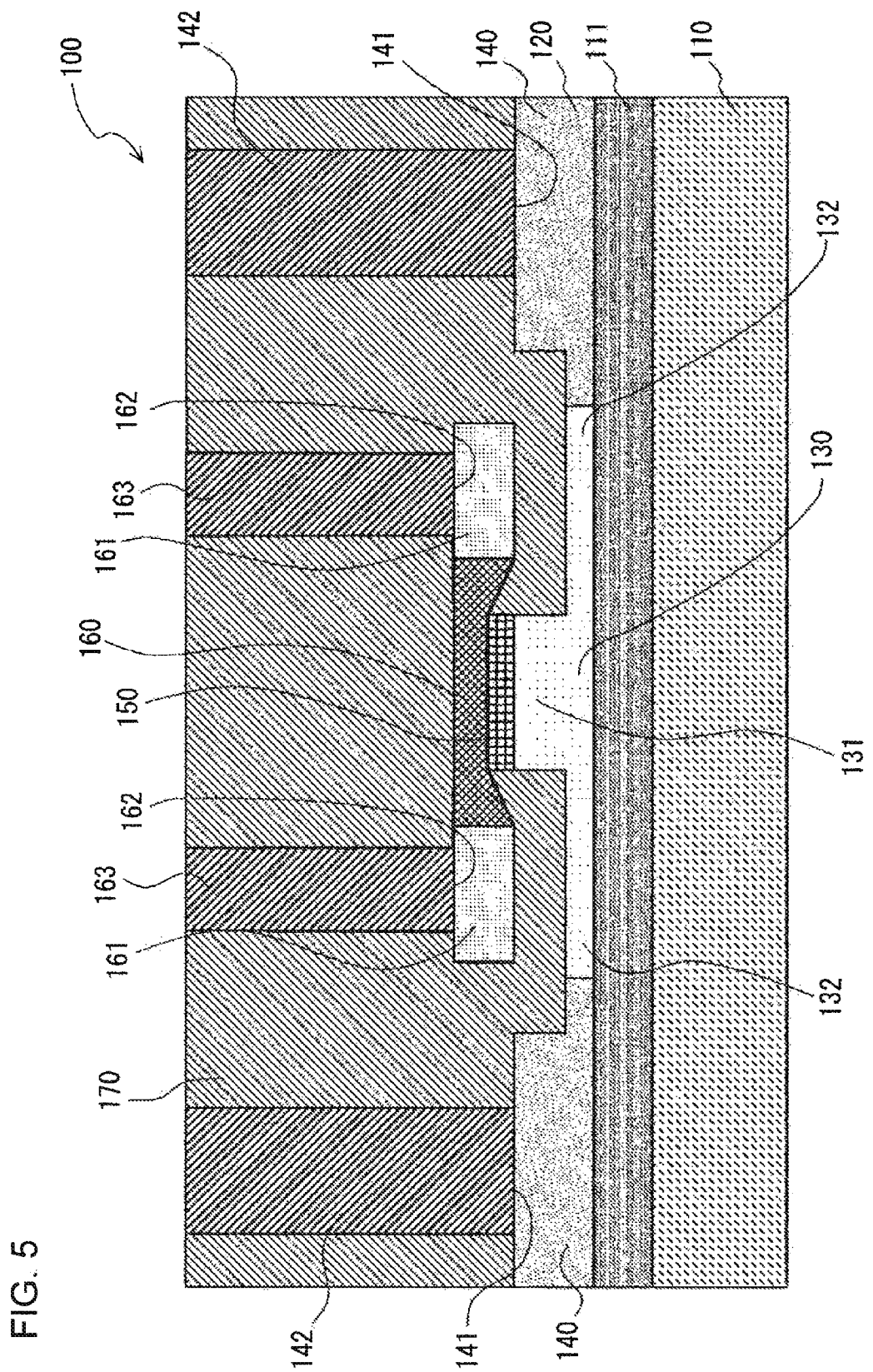

FIGS. 4 and 5 each show an example of adjusting the thickness of the second silicon semiconductor layer 160.

As shown in FIGS. 4 and 5, within the second silicon semiconductor layer 160, the thickness of the heavily doped regions 161, 161 is set to be larger than that of the region present just on the dielectric layer 150 and above the rib portion 131. Conversely, the thickness of the region present just on the dielectric layer 150 and above the rib portion 131 is set to be smaller than that of the heavily doped regions 161, 161, within the second silicon semiconductor layer 160. In FIG. 4, the structure with the above-described adjustment is realized by depressing the top surface side of the second silicon semiconductor layer 160 at a location corresponding to that just on the dielectric layer 150 and above the rib portion 131. In FIG. 5, the structure with the above-described adjustment is realized, in an opposite manner, by depressing the bottom surface side of the second silicon semiconductor layer 160 at a location corresponding to that just on the dielectric layer 150 and above the rib portion 131.

By employing those configurations, it becomes possible to reduce the series resistance component and accordingly the RC time constant, while maintaining the state of higher optical modulation efficiency.

(Second Exemplary Embodiment)

Hereinafter, a second exemplary embodiment of the present invention will be described.

Figure 6:
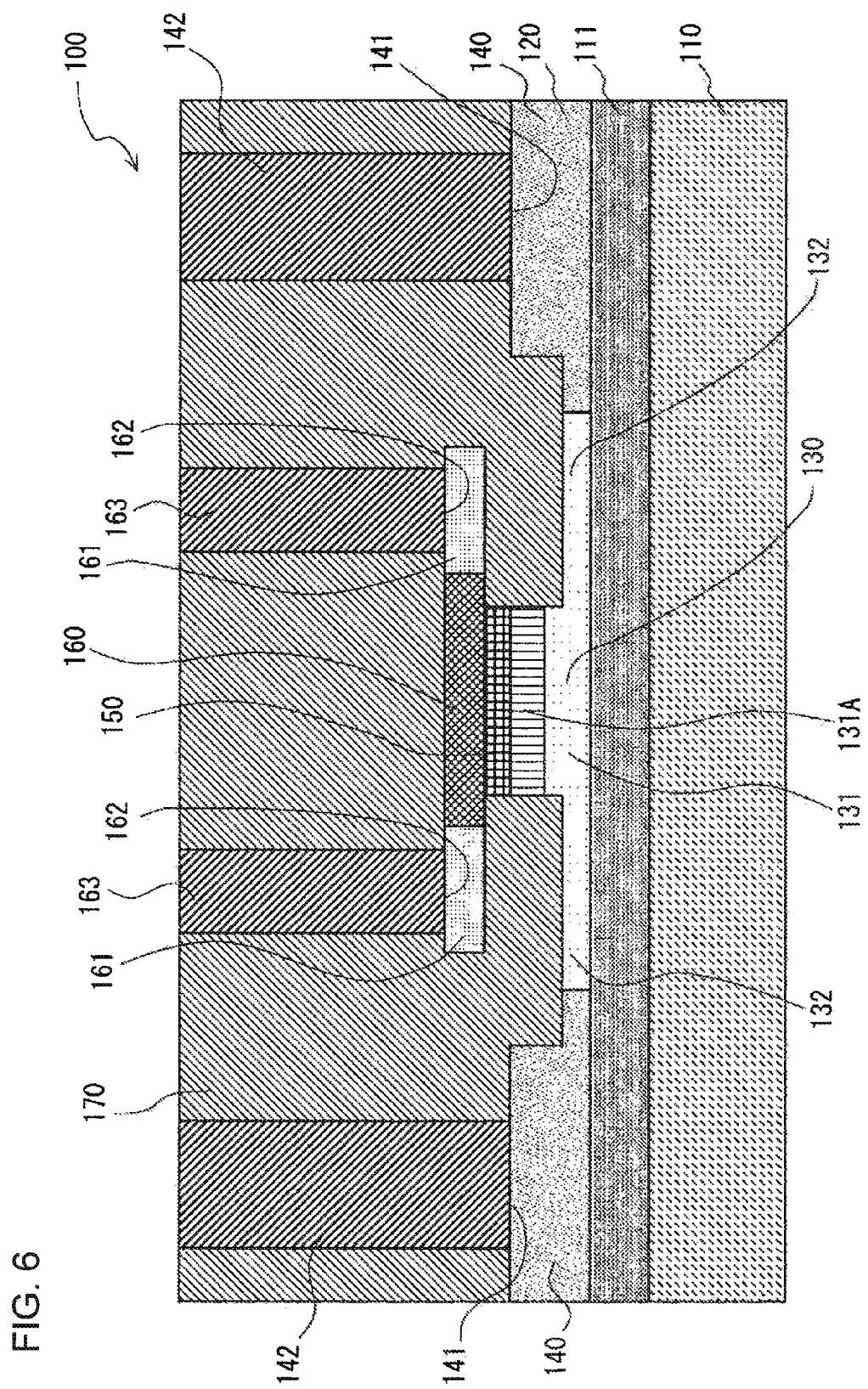

The configuration of the second exemplary embodiment is basically the same as that of the first exemplary embodiment, but it has a feature in comprising a layer made of $Si_{1-x}Ge_x$ (x=0.01 to 0.9) 131A in a top region of the rib portion. In FIG. 6, within the rib portion 131 of the rib waveguide 130, a $Si_{1-x}Ge_x$ (x=0.01 to 0.9) layer 131A is formed in a top side region. By employing such a configuration, the modulation efficiency can be further improved. In the present Description, a top side region of the rib portion 131, that is, a region neighboring to the dielectric layer 150 is referred to as a rib top region.

In the present case, with reference to a semiconductor layer thickness, denoted by W, within which free carries are accumulated, depleted or inverted on each side of the dielectric layer, the thickness of the $Si_{1-x}Ge_x$ (x=0.01 to 0.9) layer 131A formed in a rib top region is desired to be 2W or smaller. While the effect of improving the modulation efficiency is achieved even when the thickness of the $Si_{1-x}Ge_x$ (x=0.01 to 0.9) layer is set to be equal to or larger than 2W, 2W or smaller is desirable to achieve a larger effect.

Specifically, the value W corresponding to the maximum depletion layer thickness is given by the following expression in the thermal equilibrium state.

[Expression 4]

$$W = 2\sqrt{\frac{\varepsilon_s kT \ln\left(\frac{N_c}{n_i}\right)}{e^2 N_c}} \quad \text{(Expression 4)}$$

Here, $\varepsilon_s$ is the permittivity of the semiconductor layer, k the Boltzman constant, $N_c$ the carrier density, $n_i$ the intrinsic carrier concentration, and e is the electron charge. For example, the maximum depletion layer thickness W is about 0.1 µm when $N_c$ is $10^{17}/cm^3$, and with increasing the carrier density, the depletion layer thickness W, that is, the thickness of a region in which carrier density modulation occurs is decreased.

Figure 7:
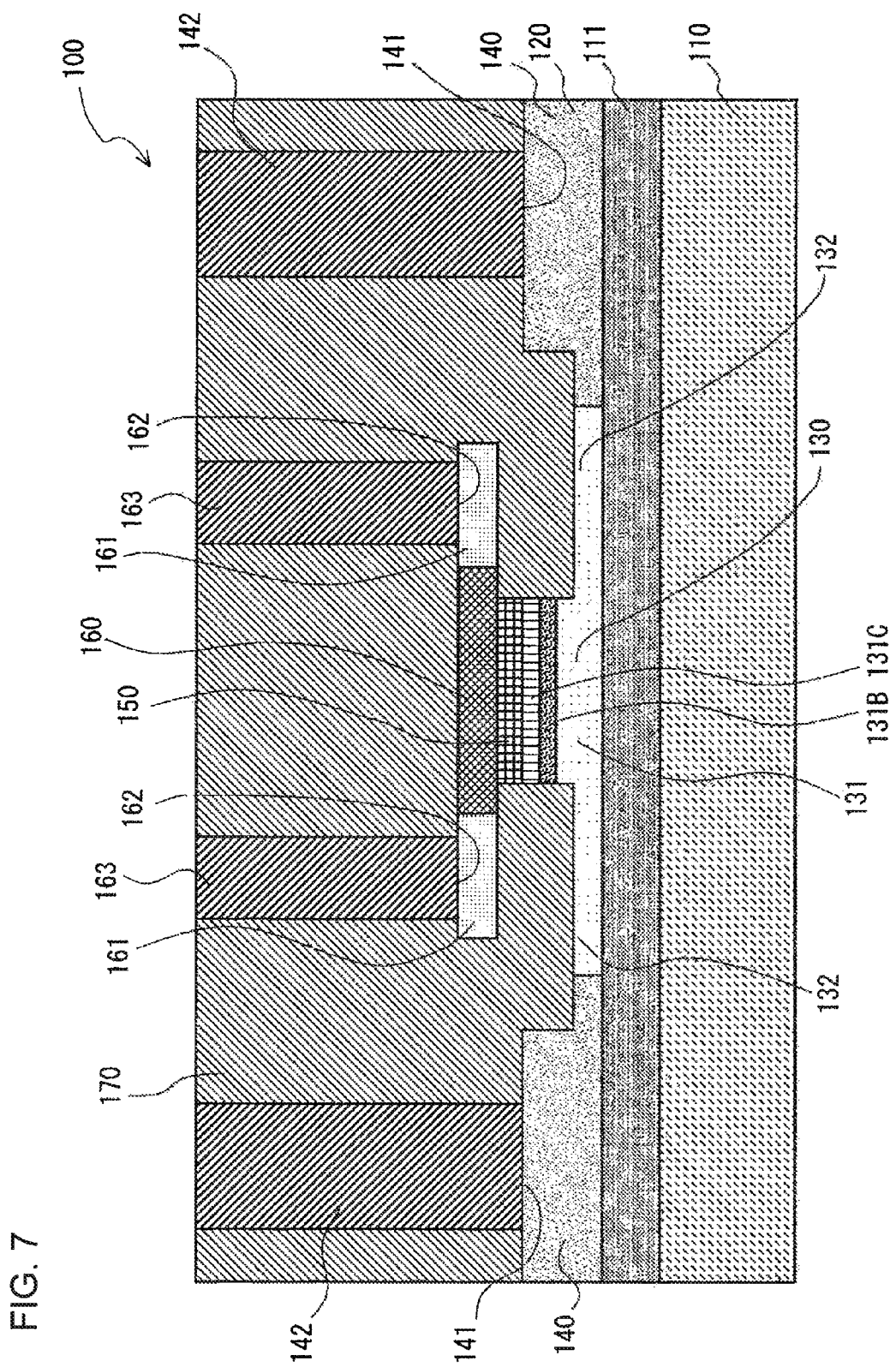

Further, as shown in FIG. 7, the $Si_{1-x}Ge_x$ (x=0.01 to 0.9) layer may be made to be a stack structure consisting of at least two or more kinds of $Si_{1-x}Ge_x$ (x=0.01 to 0.9) layers, in accordance with the electric field distribution of an optical field. FIG. 7 shows a situation where two kinds of $Si_{1-x}Ge_x$ (x=0.01 to 0.9) layers 131B and 131C are stacked in a rib top region.

Alternatively, the structure may be modified to comprise, in a rib top region, a $Si_{1-x}Ge_x$ (x=0.01 to 0.9) layer with its composition modulated in the thickness direction. That is, in the rib top region, composition of the $Si_{1-x}Ge_x$ (x=0.01 to 0.9) layer is adjusted such that it gradually changes in the vertical direction. By employing such a configuration, it becomes possible to realize a higher optical modulation efficiency and reduction in optical loss. Further, lattice strain may be introduced into the $Si_{1-x}Ge_x$ (x=0.01 to 0.9) layer. By that way, further higher optical modulation efficiency can be achieved.

In the above-described exemplary embodiments, preferably, the first and second silicon semiconductor layers are formed of at least one layer selected from a group consisting of layers of polycrystalline silicon, amorphous silicon, strained silicon, single crystal silicon and $Si_{1-x}Ge_x$. It is obvious that the first and second silicon semiconductor layers may be formed by variously combining and stacking the group members.

(Third Exemplary Embodiment)

Hereinafter, an example of a manufacturing process will be described, as a third exemplary embodiment of the present invention.

FIG. 8A is a cross-sectional view of an SOI substrate used for forming a silicon-based electro-optic modulator.

The SOI substrate comprises a structure in which an about 100 to 1000 nm thick Si layer is stacked on a buried oxide layer 111, and in the present case, a structure having the buried oxide layer 111 of 1000 nm or larger thickness is adopted for the purpose of reduction in optical loss. The Si layer on the buried oxide layer 111 may be formed using a substrate doped, in advance, to exhibit the first type of conductivity, or it may be doped with P (phosphorus) or B (boron) in its surface layer by ion implantation or the like and subsequently annealed. In that way, the first silicon semiconductor layer 120 is formed.

Figure 8B:
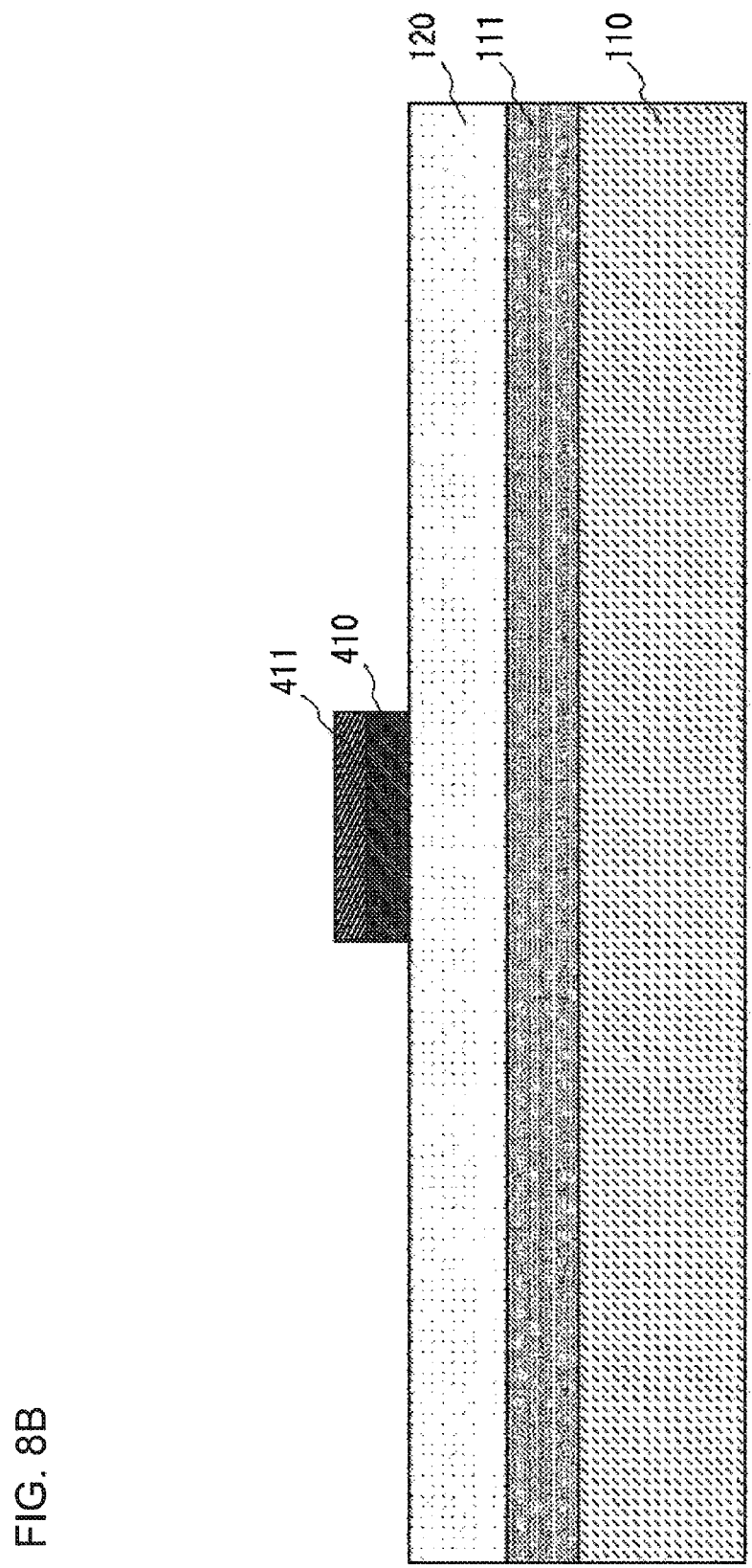
Figure 8C:
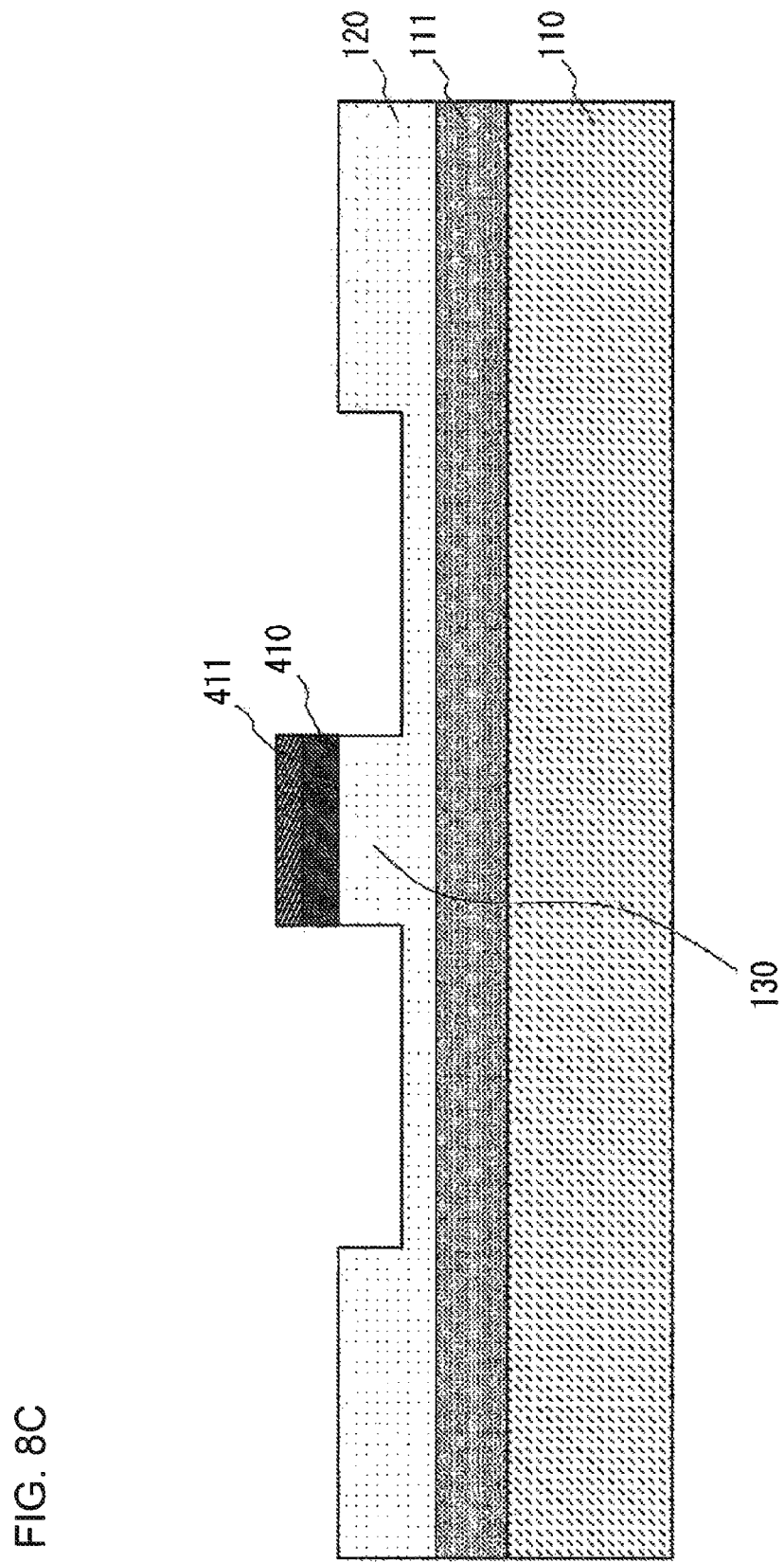

Next, as shown in FIG. 8B, a stack structure consisting of an oxide film mask 410 and a $SiN_x$ hard mask layer 411 is formed as a mask for forming the rib waveguide shape, and then patterning is performed by UV lithography and a dry etching method. As shown in FIG. 8C, as a result of thereby patterning the first silicon semiconductor layer 120 using the combination of the oxide film mask 410 and the $SiN_x$ hard mask 411 as a mask, a form of the rib waveguide 130 is fabricated. Here, as shown in FIG. 8C, regions outside the form of the rib waveguide 130 are not etched, and accordingly the height is not decreased in these regions.

Figure 8D:
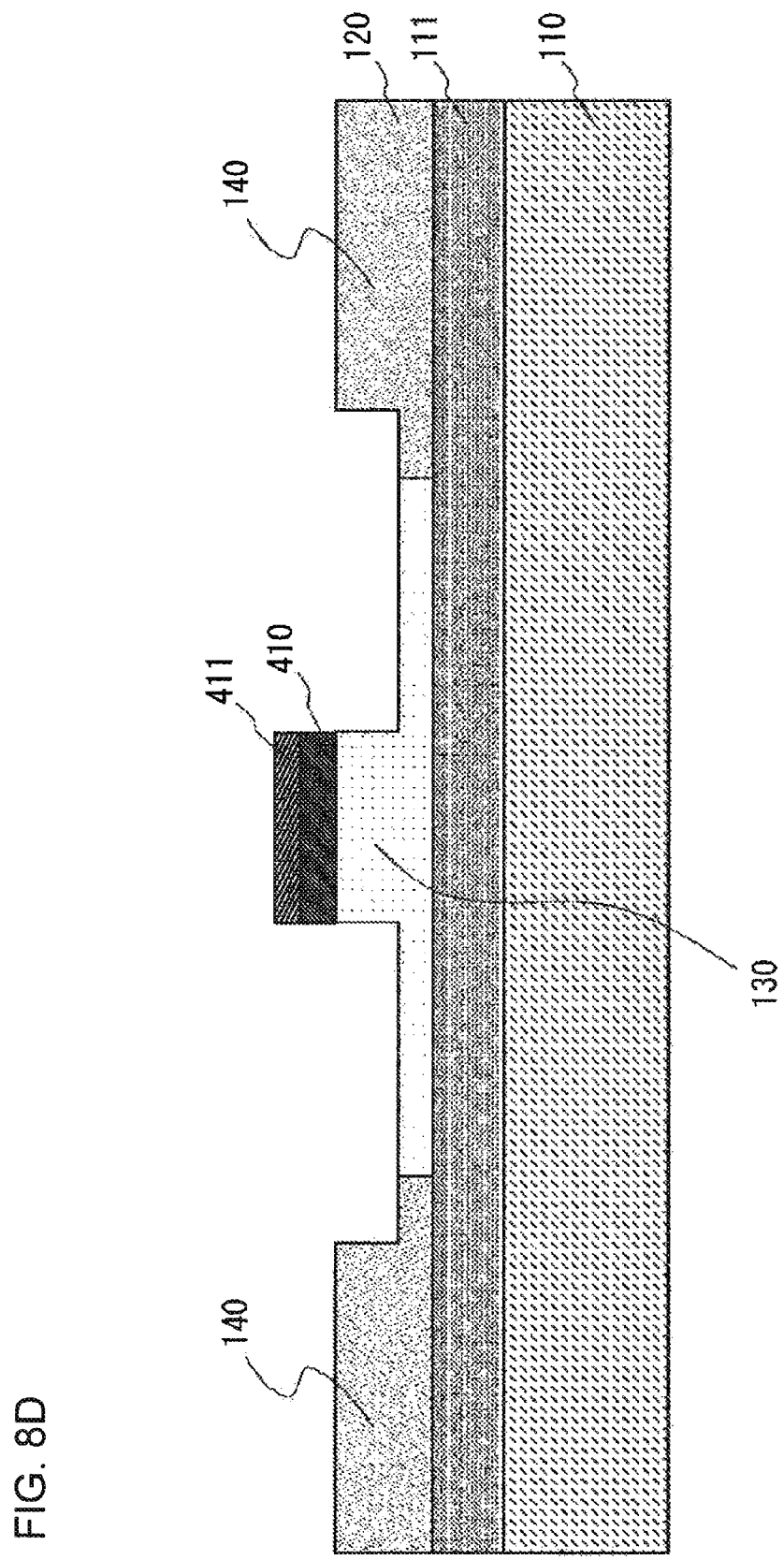

Next, as shown in FIG. 8D, the regions neighboring to and having almost the same height as the form of the rib waveguide 130 are heavily doped with B by an ion implantation method or the like. In that way, the heavily doped regions 140 are formed.

Figure 8E:
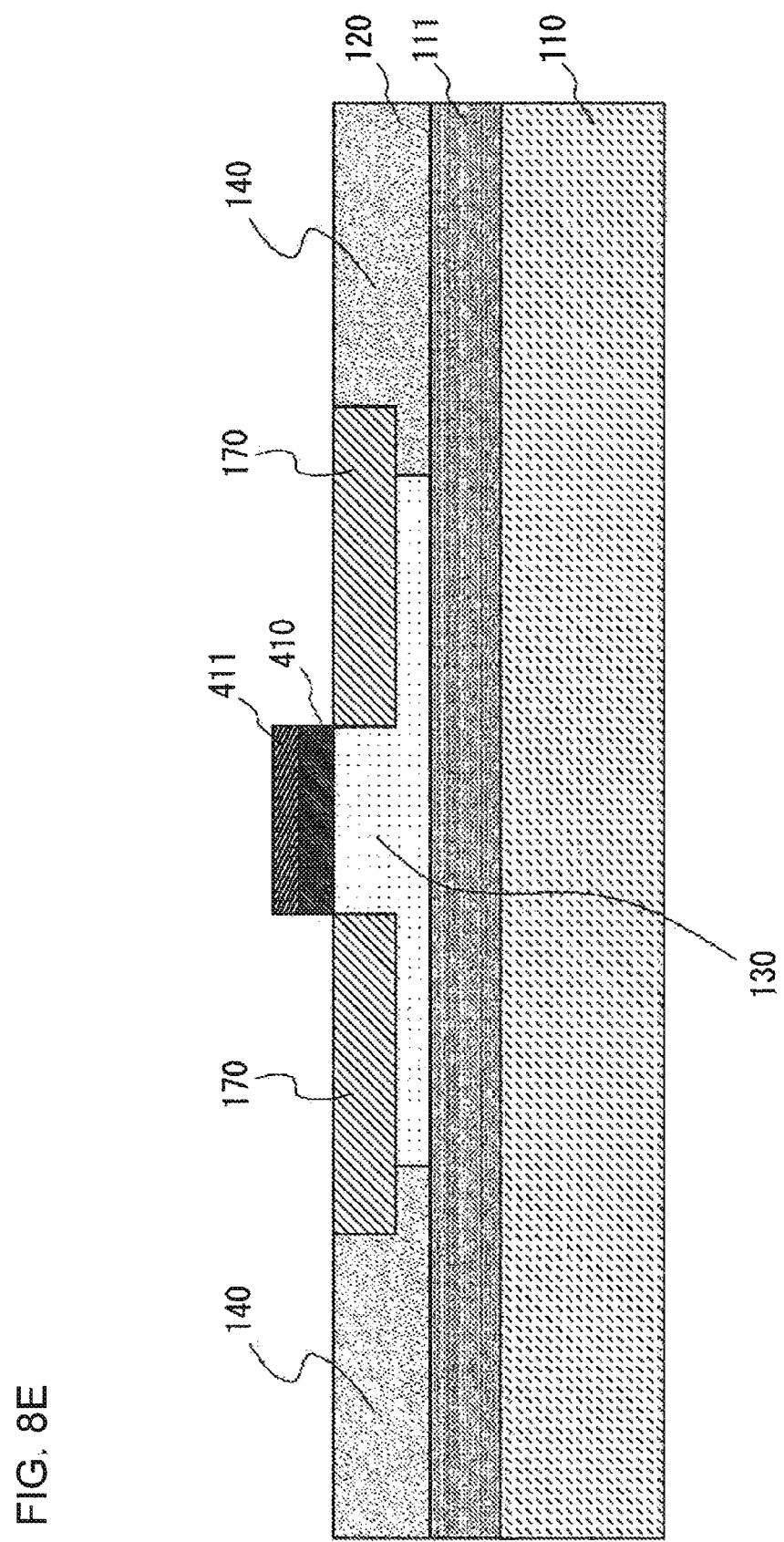

Next, as shown in FIG. 8E, the oxide cladding layer 170 is stacked, and then flattening is performed by a CMP (chemical mechanical polishing) method.

Then, as shown in FIG. 8F, the $SiN_x$ hard mask 411 and the oxide film mask 410 are removed by hot phosphoric acid and diluted fluoric acid processes or the like, and subsequently, the relatively thin dielectric layer 150 of about 5 to 10 nm thickness is formed on a top layer portion of the form of the rib waveguide 130.

Figure 8G:
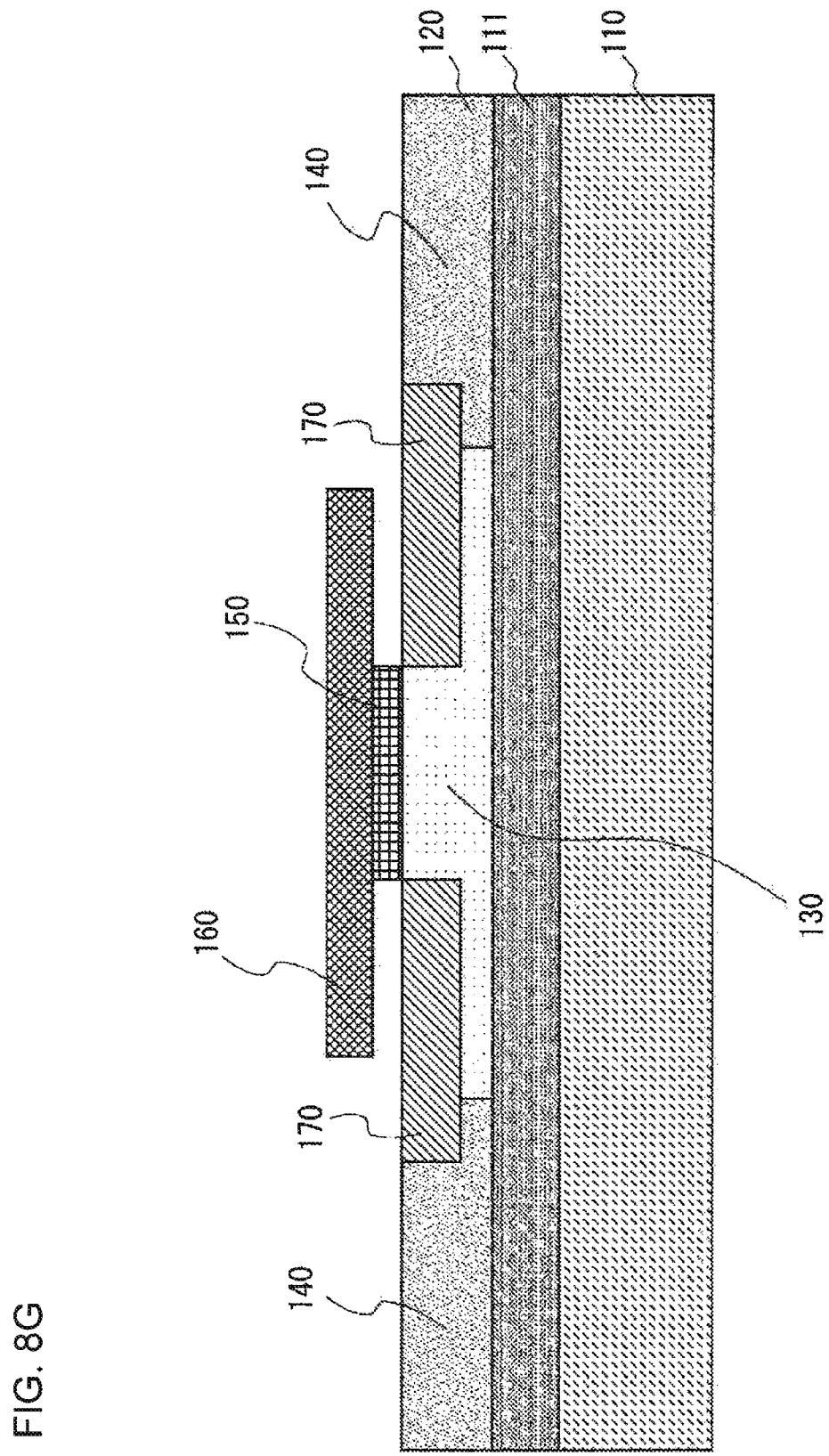

Next, as shown in FIG. 8G, an n-doped polycrystalline silicon layer 160 is stacked, and is patterned to have a width sufficient to enable formation of the second electrical contact layer, by a dry etching method or the like. In that way, the second silicon semiconductor layer 160 is formed.

Then, as shown in FIG. 8H, portions of the second silicon semiconductor layer 160 are heavily doped by an ion implantation method or the like, so as to enable formation of the second electrical contact portions 162, 162. In that way, the heavily doped regions 161, 161 are formed.

Figure 8I:
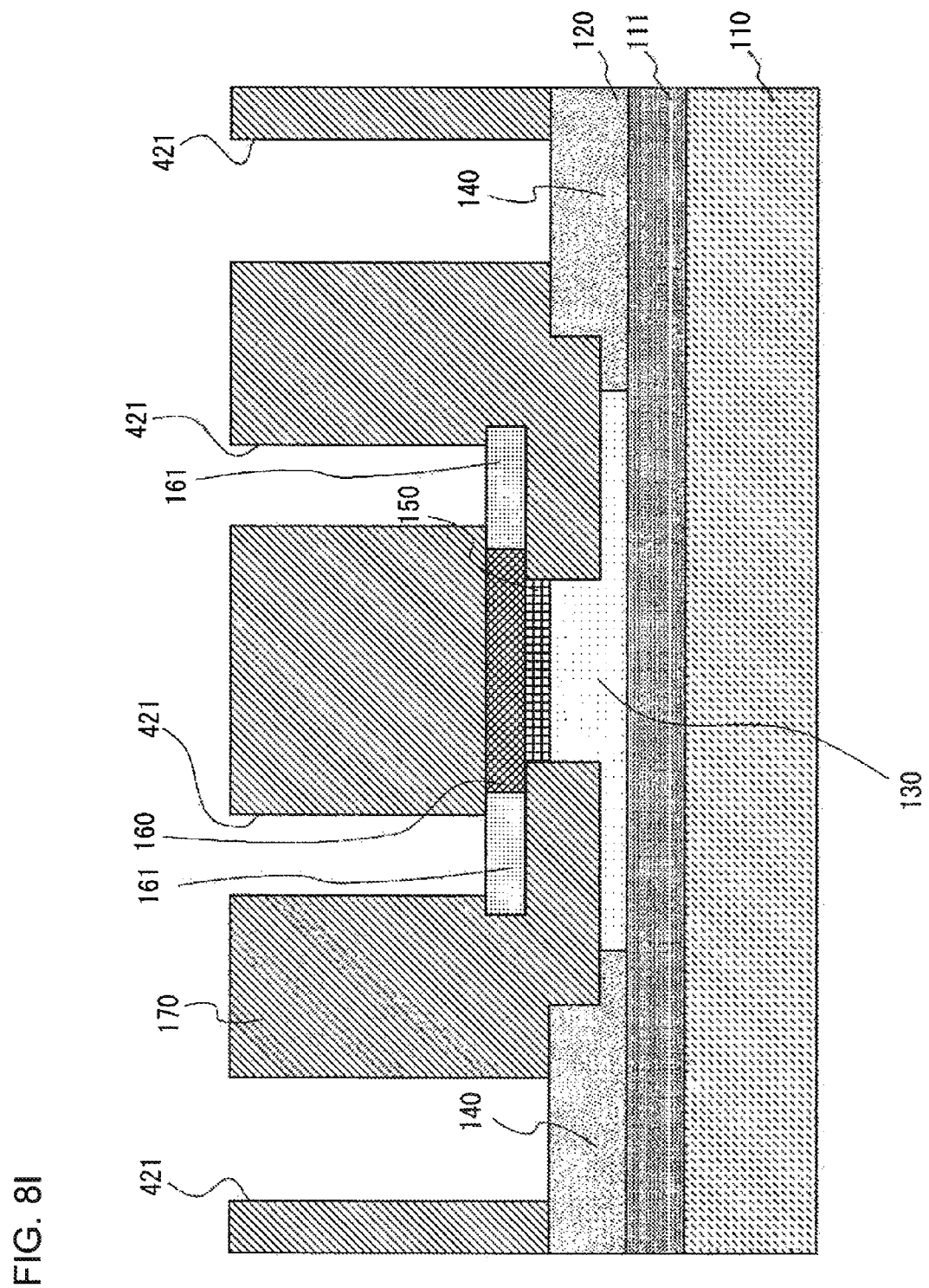

Next, as shown in FIG. 8I, an about 1 μm thick additional portion of the oxide cladding layer 170 is stacked, and subsequently, contact holes 421 for making first and second electrical contacts are formed by a dry etching method or the like.

Finally, as shown in FIG. 8J, by forming a metal layer of Ti/TiN/Al (Cu) or Ti/TiN/W by a sputtering method or a CVD method and then patterning it by a reactive etching, the electrode wirings 142, 142 and 163, 163 are formed to make connection with a driving circuit.

Figure 9:
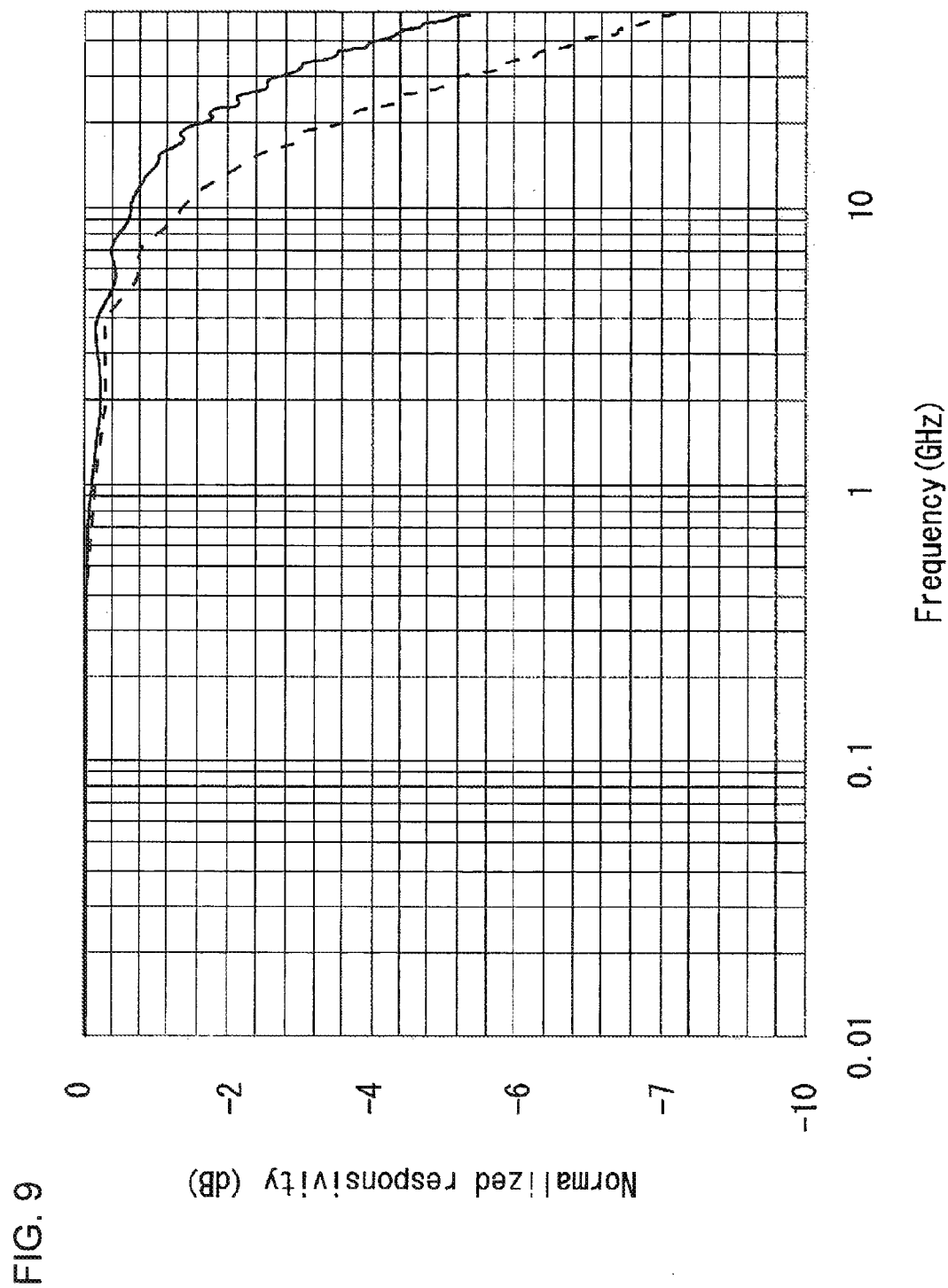

FIG. 9 is a diagram showing a frequency characteristic of the optical modulation efficiency in the silicon-based electro-optic modulator according to the present invention and that in a conventional type one (for example, the type of FIG. 2). The solid line shows the frequency characteristic of the optical modulation efficiency in the silicon-based electro-optic modulator according to the present invention. The dashed line shows the frequency characteristic of the optical modulation efficiency in the conventional type electro-optic modulator (for example, the type of FIG. 2). As a result of the increase in the thicknesses of the heavily doped regions 140, 140 and 161, 161 and the reduction in the series resistances of the first and second electrical contact portions 141, 141 and 162, 162, the RC time constant is reduced, and accordingly, about 30 GHz improvement in the frequency bandwidth is achieved.

In addition to the above-mentioned factors, the carrier mobility and lifetime are very important for improving the frequency bandwidth. In particular, the carrier mobility in a polycrystalline silicon layer is to be mentioned as an issue in terms of high speed operation. Accordingly, it is effective either to improve the carrier mobility by increasing the grain size through recrystallization by annealing or to improve the crystalline quality by using an epitaxial lateral overgrowth (ELO) method in formation of the second silicon semiconductor layer 160.

(Fourth Exemplary Embodiment)

Figure 10:
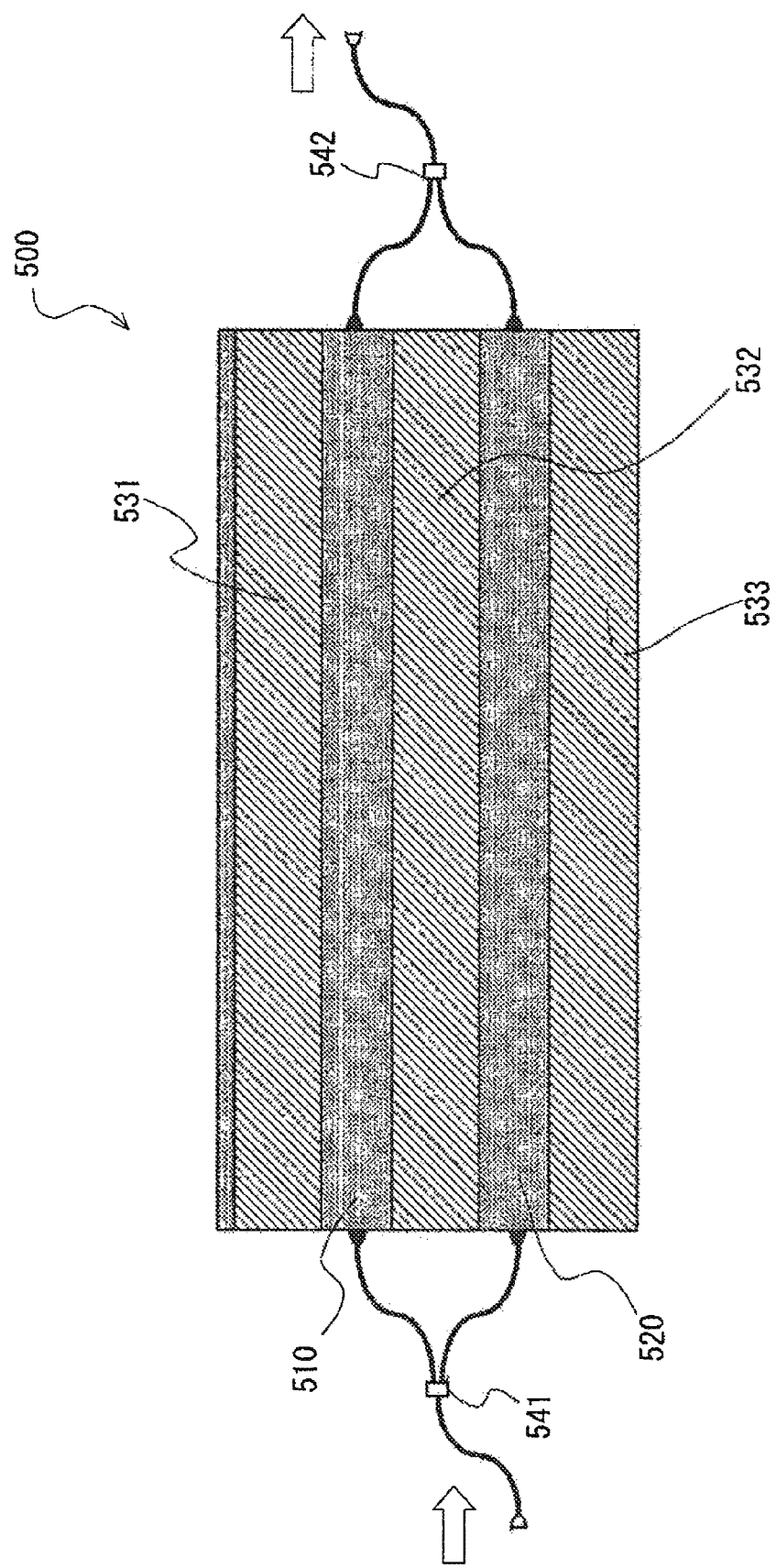

FIG. 10 shows a Mach-Zehnder interferometer type optical intensity modulator 500, as a fourth exemplary embodiment of the present invention.

In FIG. 10, a silicon-based electro-optic modulator as a first arm 510 and a silicon-based electro-optic modulator as a second arm 520 are arranged in parallel with each other. There, electrode pads 531, 532 and 533 are arranged in a manner to put respective ones of the first and second arms 510 and 520 between the pads. Further, a light splitting structure 541 is arranged on the input side, and a light combining structure 542 on the output side.

Optical input is split by the light splitting structure 541, and the resultant optical signals enter, respectively, the first and second arms 510 and 520. Then, phase modulation of the respective optical signals are performed in the first and second arms 510 and 520, and subsequently, phase interference between the optical signals is performed by the light combining structure 542.

In that way, a signal with modulated optical intensity (an optical intensity modulated signal) is generated.

In the present exemplary embodiment, by the light splitting structure 541 arranged on the input side, input light is split into equal power signals entering, respectively, the first and second arms 510 and 520.

By applying a plus voltage to the first arm 510, carrier accumulation is generated on each side of the thin dielectric layer 150 in the first arm 510, and by applying a minus voltage to the second arm 520, carriers on each side of the thin dielectric layer 150 are removed in the second arm 520.

As a result, the refractive index felt by an optical signal electric field in each of the silicon-based electro-optic modulators is decreased in the carrier accumulation mode, and is increased in the carrier removal (depletion) mode, and accordingly, the optical signal phase difference between the first and second arms 510 and 520 is maximized. By combining the optical signals transmitted through, respectively, the first and second arms 510 and 520 by means of the light combining structure 542 on the output side, optical intensity modulation is generated. In the silicon-based electro-optic modulator 500 of the present exemplary embodiment, its capability of transmitting optical signals of 40 Gbps or beyond has been confirmed.

Figure 11:
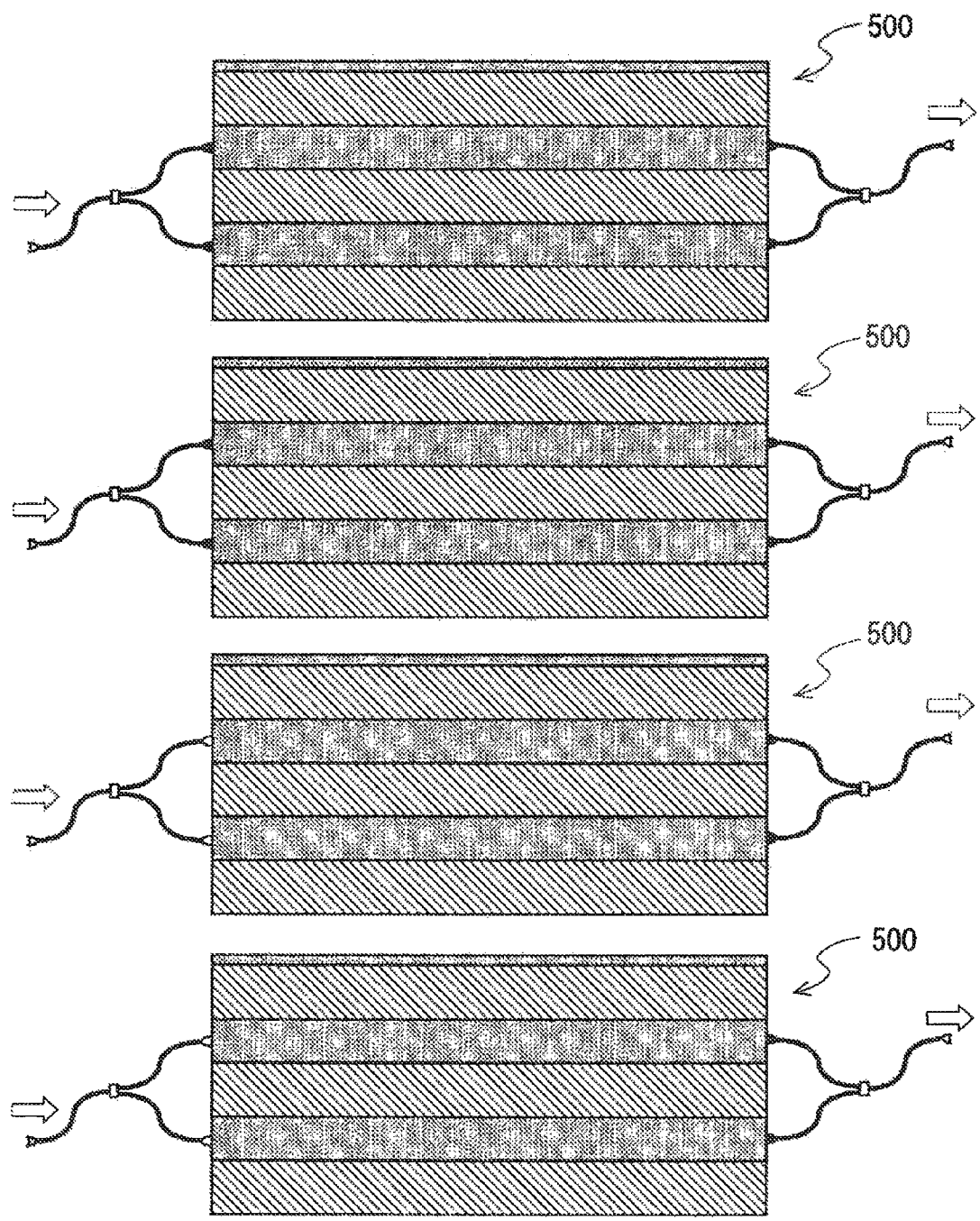
Figure 12:
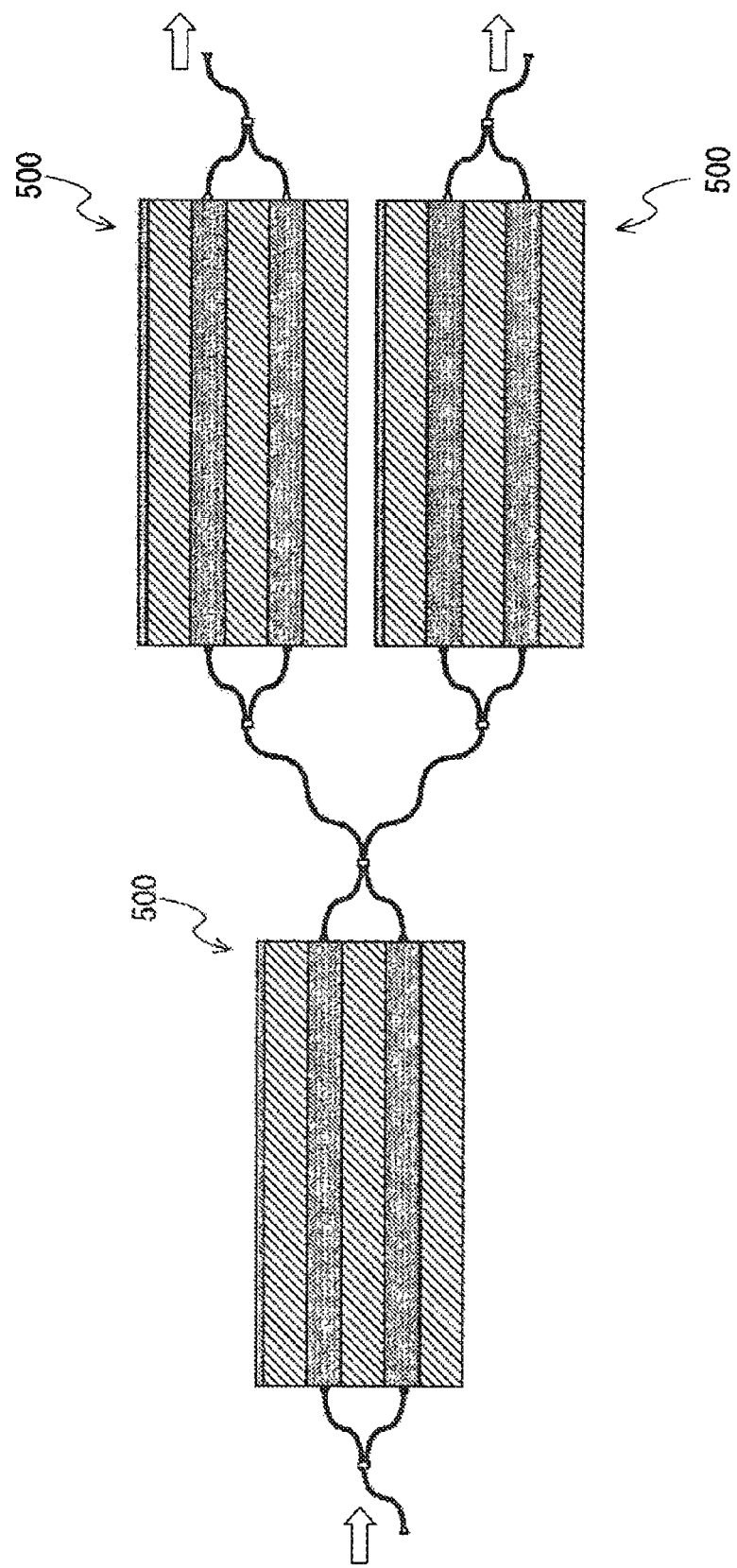

Further, the above-described electro-optic modulator 500 consisting of a Mach-Zehnder interferometer can be applied also to an optical modulator, a matrix optical switch and the like having a higher transfer rate, by arranging a plurality of the electro-optic modulator 500 in parallel or in series, as shown in FIGS. 11 and 12.

FIG. 11 is a diagram showing a situation where a plurality of the electro-optic modulators 500 consisting of a Mach-Zehnder interferometer are arranged in parallel.

FIG. 12 is a diagram showing a situation where a plurality of the electro-optic modulators 500 consisting of a Mach-Zehnder interferometer are arranged in series.

The present invention is not limited to the above-described exemplary embodiments, but may be appropriately changed within a range not departing from the spirit of the present invention.

For example, it is obvious that the above-described exemplary embodiments may be appropriately combined.

Part or the whole of the above-described exemplary embodiments can be described as, but is not limited to, the following supplementary notes.

(Supplementary Note 1)

A silicon-based electro-optic modulator
having an SIS (semiconductor-insulator-semiconductor) junction in which a first silicon semiconductor layer doped to exhibit a first type of conductivity and a second semiconductor layer doped to exhibit a second type of conductivity are at least partly stacked together, and a relatively thin dielectric is formed at the interface between the stacked first and second silicon semiconductor layers, and exploiting that the free carrier concentration felt by an optical signal electric field is modulated as a result of free carriers' being accumulated, depleted or inverted on each side of the relatively thin dielectric layer by electrical signals from electrical terminals connected with, respectively, the first and second silicon semiconductor layers, wherein:

the silicon-based electro-optic modulator is characterized by that: the first silicon semiconductor layer is fabricated into a rib waveguide shape comprising a rib portion, which is formed into a protruding shape and to become the core of the rib waveguide, and slab portions which are located on respective sides of the rib portion and connected with the rib portion;

the silicon-based electro-optic modulator comprises a first heavily doped region formed by a high concentration doping process, in a portion of the first silicon semiconductor layer neighboring to each of the slab portions, and a second heavily doped region formed by high concentration doping into a portion of the second silicon semiconductor layer; and the first heavily doped region has almost the same height as that of the rib portion of the rib waveguide.

(Supplementary Note 2)

The silicon-based electro-optic modulator according to supplementary note 1, wherein, within the second silicon semiconductor layer, the thickness of a region located just above the rib portion is smaller than that of the second heavily doped region.

(Supplementary Note 3)

The silicon-based electro-optic modulator according to supplementary notes 1 or 2, wherein a top region of the rib portion consists of a $Si_{1-x}Ge_x$ (x=0.01 to 0.9) layer.

(Supplementary Note 4)

The silicon-based electro-optic modulator according to supplementary note 3, wherein a top region of the rib portion consists of a $Si_{1-x}Ge_x$ (x=0.01 to 0.9) layer, and more specifically, consists of a stack structure of at least two or more layers having different $Si_{1-x}Ge_x$ (x=0.01 to 0.9) compositions.

(Supplementary Note 5)

The silicon-based electro-optic modulator according to supplementary note 3, wherein a top region of the rib portion consists of a $Si_{1-x}Ge_x$ (x=0.01 to 0.9) layer, and more specifically, consists of a structure in which the $Si_{1-x}Ge_x$ (x=0.01 to 0.9) composition is modulated in the thickness direction.

(Supplementary Note 6)

The silicon-based electro-optic modulator according to supplementary note 3, wherein a top region of the rib portion consists of a $Si_{1-x}Ge_x$ (x=0.01 to 0.9) layer with lattice strain.

(Supplementary Note 7)

The silicon-based electro-optic modulator according to any one of supplementary notes 1 to 6, wherein the first and second silicon semiconductor layers each include at least one layer selected from a group consisting of layers of polycrystalline silicon, amorphous silicon, strained silicon, single crystal silicon and $Si_{1-x}Ge_x$.

(Supplementary Note 8)

The silicon-based electro-optic modulator according to any one of supplementary notes 1 to 7, wherein an optical modulated signal is generated by applying at least one electrical modulated signal, as input, to at least one of the first and second heavily doped regions.

(Supplementary Note 9)

A Mach-Zehnder interferometer type electro-optic modulator comprising:

a first arm which is a silicon-based electro-optic modulator according to any one of supplementary notes 1 to 8;

a second arm which is a silicon-based electro-optic modulator according to any one of supplementary notes 1 to 8 and arranged parallel to the first arm;

a light splitting unit which splits light at the input side; and a light combining unit which combines light at the output side, wherein optical intensity modulated signals are generated by performing phase modulation of optical signals in the first and second arms and by causing phase interference by means of the light combining unit.

(Supplementary Note 10)

The Mach-Zehnder interferometer type electro-optic modulator according to supplementary note 9, wherein the first and second arms are configured asymmetrically to each other.

(Supplementary Note 11)

The Mach-Zehnder interferometer type electro-optic modulator according to supplementary notes 9 or 10, wherein the light splitting unit gives an input signal distribution ratio other than 1:1 to the first and second arms.

(Supplementary Note 12)

A Mach-Zehnder interferometer type electro-optic modulator characterized by:

comprising a plurality of Mach-Zehnder interferometer type electro-optic modulators according to any one of supplementary notes 9 to 11; and arranging the plurality of Mach-Zehnder interferometer type electro-optic modulators in parallel.

(Supplementary Note 13)

A Mach-Zehnder interferometer type electro-optic modulator characterized by:

comprising a plurality of Mach-Zehnder interferometer type electro-optic modulators according to any one of supplementary notes 9 to 11; and arranging the plurality of Mach-Zehnder interferometer type electro-optic modulators in series.

The present invention has been described above with reference to the exemplary embodiments, but the present invention is not limited by the above descriptions. To the configurations and details of the present invention, various changes which are understandable to those skilled in the art may be made within the scope of the present invention.

The present application is based upon and claims the benefit of priority from Japanese Patent Application No. 2013-63285, filed on Mar. 26, 2013, the disclosure of which is incorporated herein in its entirety by reference.

REFERENCE SIGNS LIST

11 . . . silicon substrate, 12 . . . oxide layer, 14 . . . rib waveguide, 15 . . . protruding portion, 16 . . . slab portion, 30 . . . silicon-based electro-optic modulator, 31 . . . silicon substrate, 33 . . . oxide cladding layer, 34 . . . body region, 35 . . . heavily doped region, 36 . . . first electrode contact layer, 37 . . . electrode wiring, 38 . . . gate region, 39 . . . heavily doped region, 40 . . . second electrode contact layer. 41 . . . electrode wiring, 42 . . . gate dielectric layer, 100 . . . silicon-based electro-optic modulator, 110 . . . silicon substrate, 111 . . . oxide layer, 120 . . . first silicon semiconductor layer, 130 . . . rib waveguide, 131 . . . rib portion, 132 . . . slab portion, 140 . . . heavily doped region, 141 . . . first electrical contact portion, 142 . . . electrode wiring, 150 . . . dielectric layer, 160 . . . second silicon semiconductor layer, 161 . . . heavily doped region, 162 . . . second electrical contact portion, 163 . . . electrode wiring, 170 . . . oxide cladding layer, 410 . . . oxide mask, 411 . . . hard mask layer, 421 . . . contact hole, 500 . . . silicon-based electro-optic modulator, 510 . . . first arm, 520 . . . second arm, 531 . . . electrode pad, 541 . . . light splitting structure, 542 . . . light combining structure.

What is claimed is:

1. A silicon-based electro-optic modulator
    having an SIS (semiconductor-insulator-semiconductor) junction in which a first silicon semiconductor layer doped to exhibit a first type of conductivity and a second semiconductor layer doped to exhibit a second type of conductivity are at least partly stacked together, and a relatively thin dielectric is formed at the interface between the stacked first and second silicon semiconductor layers, and
    exploiting that the free carrier concentration felt by an optical signal electric field is modulated as a result of free carriers' being accumulated, depleted or inverted on each side of the relatively thin dielectric layer by electrical signals from electrical terminals connected with, respectively, the first and second silicon semiconductor layers, wherein:
    the first silicon semiconductor layer is fabricated into a rib waveguide shape comprising a rib portion, which is formed into a protruding shape and to become the core of the rib waveguide, and slab portions which are located on respective sides of the rib portion and connected with the rib portion;
    the silicon-based electro-optic modulator comprises a first heavily doped region formed by a high concentration doping process, in a portion of the first silicon semiconductor layer neighboring to each of the slab portions, and a second heavily doped region formed by high concentration doping into a portion of the second silicon semiconductor layer; and
    the first heavily doped region has almost the same height as that of the rib portion of the rib waveguide,
    wherein a top region of the rib portion consists of a $Si_{1-x}Ge_x$(x=0.01 to 0.9) layer, and more specifically, consists of a stack structure of at least two or more layers having different $Si_{1-x}Ge_x$(x=0.01 to 0.9) compositions.

2. The silicon-based electro-optic modulator according to claim 1, wherein,
    within the second silicon semiconductor layer, the thickness of a region located just above the rib portion is smaller than that of the second heavily doped region.

3. The silicon-based electro-optic modulator according to claim 1, wherein
    a top region of the rib portion consists of a $Si_{1-x}Ge_x$ (x=0.01 to 0.9) layer, and more specifically, consists of a structure in which the $Si_{1-x}Ge_x$(x=0.01 to 0.9) composition is modulated in the thickness direction.

4. The silicon-based electro-optic modulator according to claim 1, wherein
    a top region of the rib portion consists of a $Si_{1-x}Ge_x$ (x=0.01 to 0.9) layer with lattice strain.

5. The silicon-based electro-optic modulator according to claim 1, wherein
    the first and second silicon semiconductor layers each include at least one layer selected from a group consisting of layers of polycrystalline silicon, amorphous silicon, strained silicon, single crystal silicon and $Si_{1-x}Ge_x$.

6. The silicon-based electro-optic modulator according to claim 1, wherein
    an optical modulated signal is generated by applying at least one electrical modulated signal, as input, to at least one of the first and second heavily doped regions.

7. A Mach-Zehnder interferometer type electro-optic modulator comprising:
    a first arm which is a silicon-based electro-optic modulator according to claim 1;
    a second arm which is a silicon-based electro-optic modulator according to claim 1 and arranged parallel to the first arm;
    a light splitting unit which splits light at the input side; and a light combining unit which combines light at the output side, wherein
    optical intensity modulated signals are generated by performing phase modulation of optical signals in the first and second arms and by causing phase interference by means of the light combining unit.

8. The Mach-Zehnder interferometer type electro-optic modulator according to claim 7, wherein
    the first and second arms are configured asymmetrically to each other.

9. The Mach-Zehnder interferometer type electro-optic modulator according to claim 7, wherein
    the light splitting unit gives an input signal distribution ratio other than 1:1 to the first and second arms.

10. A modulator device comprising:
    a plurality of Mach-Zehnder interferometer type electro-optic modulators according to claim 7; and
    arranging the plurality of Mach-Zehnder interferometer type electro-optic modulators in parallel.

11. A modulator device comprising:
    a plurality of Mach-Zehnder interferometer type electro-optic modulators according to claim 7; and
    arranging the plurality of Mach-Zehnder interferometer type electro-optic modulators in series.

12. The silicon-based electro-optic modulator according to claim 1, wherein
    the first and second silicon semiconductor layers each include at least one layer selected from a group consisting of layers of polycrystalline silicon, amorphous silicon, strained silicon, single crystal silicon and $Si_{1-x}Ge_x$.

13. The silicon-based electro-optic modulator according to claim 3, wherein
    the first and second silicon semiconductor layers each include at least one layer selected from a group consisting of layers of polycrystalline silicon, amorphous silicon, strained silicon, single crystal silicon and $Si_{1-x}Ge_x$.

14. The silicon-based electro-optic modulator according to claim 1, wherein
    an optical modulated signal is generated by applying at least one electrical modulated signal, as input, to at least one of the first and second heavily doped regions.

15. The silicon-based electro-optic modulator according to claim 3, wherein
    an optical modulated signal is generated by applying at least one electrical modulated signal, as input, to at least one of the first and second heavily doped regions.

16. A Mach-Zehnder interferometer type electro-optic modulator comprising:
- a first arm which is a silicon-based electro-optic modulator according to claim 1;
- a second arm which is a silicon-based electro-optic modulator according to claim 1 and arranged parallel to the first arm;
- a light splitting unit which splits light at the input side; and a light combining unit which combines light at the output side, wherein
- optical intensity modulated signals are generated by performing phase modulation of optical signals in the first and second arms and by causing phase interference by means of the light combining unit.

17. A Mach-Zehnder interferometer type electro-optic modulator comprising:
- a first arm which is a silicon-based electro-optic modulator according to claim 3;
- a second arm which is a silicon-based electro-optic modulator according to claim 3 and arranged parallel to the first arm;
- a light splitting unit which splits light at the input side; and a light combining unit which combines light at the output side, wherein
- optical intensity modulated signals are generated by performing phase modulation of optical signals in the first and second arms and by causing phase interference by means of the light combining unit.

* * * * *